United States Patent
Kolk

(10) Patent No.: US 10,151,506 B2
(45) Date of Patent: Dec. 11, 2018

(54) METHOD, CONTROLLERS, AND SYSTEMS FOR ENERGY CONTROL AND SAVINGS ESTIMATION OF DUTY CYCLED HVAC AND R EQUIPMENT

(71) Applicant: PaceControls, LLC, Philadelphia, PA (US)

(72) Inventor: Richard A. Kolk, Philadelphia, PA (US)

(73) Assignee: PaceControls, LLC, Philadelphia, PA (US)

( * ) Notice: Subject to any disclaimer, the term of this patent is extended or adjusted under 35 U.S.C. 154(b) by 0 days.

(21) Appl. No.: 15/740,940

(22) PCT Filed: Jun. 30, 2016

(86) PCT No.: PCT/US2016/040230
§ 371 (c)(1),
(2) Date: Dec. 29, 2017

(87) PCT Pub. No.: WO2017/004286
PCT Pub. Date: Jan. 5, 2017

(65) Prior Publication Data
US 2018/0187913 A1 Jul. 5, 2018

Related U.S. Application Data

(60) Provisional application No. 62/187,842, filed on Jul. 2, 2015.

(51) Int. Cl.
*F24F 11/61* (2018.01)
*F24F 11/46* (2018.01)
(Continued)

(52) U.S. Cl.
CPC .............. *F24F 11/46* (2018.01); *F24F 11/00* (2013.01); *F24F 11/56* (2018.01); *F24F 11/61* (2018.01);
(Continued)

(58) Field of Classification Search
CPC ...................................................... F24F 11/61
See application file for complete search history.

(56) References Cited

U.S. PATENT DOCUMENTS

| 8,315,896 B2 | 11/2012 | Tennefoss |
| 2006/0188672 A1 | 8/2006 | Brower |

(Continued)

FOREIGN PATENT DOCUMENTS

| WO | 2014144175 A1 | 9/2014 |
| WO | 2014152276 A1 | 9/2014 |

OTHER PUBLICATIONS

International Search Report and Written Opinion issued in corresponding International Patent Application No. PCT/US2016/040230 dated Sep. 22, 2016 (10 pages).

*Primary Examiner* — Tejal Gami
(74) *Attorney, Agent, or Firm* — Kilyk & Bowersox, P.L.L.C.

(57) ABSTRACT

Method to automatically manage and provide energy control and estimated energy savings for duty cycled HVAC&R equipment in an improved manner as compared to operation with hysteresis on/off thermostat control itself, wherein a time delay for control signals is determined which can provide selected energy savings and can be applied to control signals to a load unit. An electronic controller can be used as an add-on device in HVAC&R systems with thermostat control which automatically manages and provides the energy control for estimated savings for duty cycled HVAC&R equipment.

19 Claims, 19 Drawing Sheets

(51) Int. Cl.
*F24F 11/00* (2018.01)
*G05D 23/19* (2006.01)
*F24F 11/64* (2018.01)
*F24F 11/65* (2018.01)
*F24F 11/56* (2018.01)
*G05B 13/04* (2006.01)
*F24F 11/63* (2018.01)
*F24F 140/60* (2018.01)
*F24F 140/50* (2018.01)
*F24F 130/10* (2018.01)
*F24F 110/10* (2018.01)
*F24F 110/12* (2018.01)

(52) U.S. Cl.
CPC .............. *F24F 11/64* (2018.01); *F24F 11/65* (2018.01); *G05B 13/042* (2013.01); *G05D 23/1917* (2013.01); *F24F 11/63* (2018.01); *F24F 2110/10* (2018.01); *F24F 2110/12* (2018.01); *F24F 2130/10* (2018.01); *F24F 2140/50* (2018.01); *F24F 2140/60* (2018.01)

(56) References Cited

U.S. PATENT DOCUMENTS

| | | |
|---|---|---|
| 2012/0273581 A1 | 11/2012 | Kolk et al. |
| 2012/0330465 A1 | 12/2012 | O'Neill et al. |
| 2013/0030732 A1 | 1/2013 | Shetty et al. |
| 2013/0305075 A1 | 11/2013 | Vasan et al. |
| 2015/0159905 A1 | 6/2015 | Lau |

900

DIFFERENTIAL EQUATION $\dot{t}Zone = A\,(tOAT - tZone)$ $\dfrac{tZone(k) - tZone(k-1)}{\Delta T} = A\,(tOAT(k) - tZone(k))$ $A = \dfrac{tZone(k) - tZone(k-1)}{\Delta T\,(tOAT(k) - tZone(k))}$ $tOFF = \Delta T$
$db = tZone(k) - tZone(k-1)$ $A = \dfrac{db}{tOFF\,(tOAT(k) - tZone(k))}$

DIFFERENTIAL EQUATION $$\dot{tZone} = B(tSupply-tZone) + A(tOAT-tZone)$$

$$\frac{tZone(k) - tZone(k-1)}{\Delta T} = B(tSupply-tZone(k)) + A(tOAT(k) - tZone(k))$$

$$tON = \Delta T$$
$$-db = tZone(k) - tZone(k-1)$$

$$B = \frac{-db}{tON(tSupply - tZone(0))} - \frac{A(tOAT-tZone(0))}{(tSupply - tZone(0))}$$

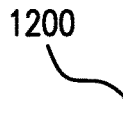

Differential Equation $\dot{t} Zone = A\, tOAT - A\, tZone + Bu_2 u_1 - B tZone$ Differential Equation $$\frac{tZone(k+1) - tZone(k)}{\Delta T} = A(k)tOAT - A(k)tZone(k) + B(k)u_2 u_1 - B(k)u_2 tZone(k)$$

FILTER STATES
$X_1 \equiv tZone$
$X_2 \equiv A$
$X_3 \equiv B$

STATE EQUATIONS
$X_1(k+1) = X_1(k) + \Delta T \{X_2(k)tOAT - X_2(k)X_1(k) + X_3(k)u_1 u_2 - X_3(k)u_2 x_1(k)\}$
$X_2(k+1) = X_2(k)$
$X_3(k+1) = X_3(k)$

PARTIAL EQUATIONS $$\frac{2X_1(k+1)}{2X_1(k)} = 1 + \Delta T \{-X_2(k) - X_3(k)u_2\}$$

$$\frac{2X_1(k+1)}{2X_2(k)} = \Delta T \{tOAT - X_1(k)\}$$

$$\frac{2X_1(k+1)}{2X_3(k)} = \Delta T \{u_1 u_2 - x_1(k)u_2\}$$

$$\frac{2X_2(k+1)}{2X_2(k)} = 1\ \&\ 0\ OTHERWISE$$

$$\frac{2X_3(k+1)}{2X_3(k)} = 1\ \&\ 0\ OTHERWISE$$

FIG. 12

METHOD, CONTROLLERS, AND SYSTEMS FOR ENERGY CONTROL AND SAVINGS ESTIMATION OF DUTY CYCLED HVAC AND R EQUIPMENT

This application is a National Stage Application of PCT/US2016/040230, filed Jun. 30, 2016, which claims the benefit under 35 U.S.C. § 119(e) of prior U.S. Provisional Patent Application No. 62/187,842, filed Jul. 2, 2015, which is incorporated in its entirety by reference herein.

BACKGROUND OF THE INVENTION

The present invention relates to a method for automatic energy control and savings estimation of duty cycled, electrical energy-consuming heating, ventilating, air conditioning and/or refrigeration equipment using sensor data, including compressor and/or gas-, oil-, and propane-fired heating equipment with or without blowers controlled via electrically powered control systems. The present invention also relates to an electronic controller for implementing such methods and heating, ventilating, air conditioning, and refrigeration equipment systems incorporating such an electronic controller.

Many electrical energy customers nowadays are interested in options that would allow them to take more control over their energy use and reduce costs thereof without requiring extensive continuous monitoring and manual interventions by the customer with respect to the operation of power-using equipment. Since it typically is costly and/or impractical to store electricity on site to fully support normal operations, especially for many commercial and industrial energy users, the use of electricity usually is made on demand from a utility's power grid. Electrical energy billing can vary depending on type of customer and specific contract, but there are some common elements. In most cases, electricity usage is metered at the customer's site and the customer may be charged in two ways by a utility. One charge is based on total consumption of electricity during a billing cycle, usually one month, and another charge is the peak demand, which is based on the highest capacity or peak intensity required by the customer during that same billing cycle. Since commercial and industrial users can have significant variance in both consumption and demand, these charges are often broken out for them as part of their rate structure. Total consumption for a billing cycle is measured in kWh, and demand is measured in kilowatts (kW). The consumption component of the customer's energy bill can be calculated by multiplying the utility's consumption rate (price per kWh) times the kWh of the customer's consumption during the billing cycle. Electrical demand is the maximum flow of electricity used at any one time by a customer measured in kilowatts (kW). The demand charge is calculated as the product of the utility's demand charge rate (cost/kW) times the peak demand (kW) for the billing cycle. Demand charge often applies to commercial, industrial, and agricultural customers, and usually not to residential customers (unless, for example, it is shared for a service area). The calculated charges for the consumption component and any demand component for a billing cycle are combined in the customer's energy bill for the billing period. Heating, ventilating, air conditioning and/or refrigeration ("HVACR" or "HVAC&R") control systems can be a significant contributor to a customer's power usage during a billing cycle.

HVAC&R control systems have been designed to perform two major functions: temperature regulation and dehumidification. Compressors and blowers used in these systems typically operate with electrically-powered motors. Increased focus on carbon footprint and green technologies has led to numerous energy related improvements, including more efficient refrigerants, variable speed compressors and fans, cycle modifications, and more efficient burners. Nevertheless, as electrical energy costs continue to increase in many markets and energy conservation becomes increasingly important, a need remains for innovations that can be applied to HVAC&R equipment in new as well as existing systems that can assist energy users in estimating savings from energy control options.

It would be desirable to provide original and/or retrofittable use energy control and savings estimation for cooling/refrigeration compressors and/or heating/cooling blowers, including those used in HVAC&R systems, which can provide energy-control and savings focused control over the OEM (Original Equipment Manufacturer) specifications, presettings, manual resettings, and/or installer judgment.

SUMMARY OF THE PRESENT INVENTION

A feature of the present invention is to provide a method to automatically manage and provide energy control and energy savings estimation for duty cycled HVAC&R equipment in an improved manner as compared to operation with thermostat control itself.

A further feature of the present invention is to provide an electronic controller which can be used as an add-on device in HVAC&R systems with thermostat control which automatically manages and provides savings estimation and energy control of duty cycled HVAC&R equipment.

Another feature of the present invention is to provide systems which incorporate the indicated controller to automatically manage and provide energy control and savings estimation of duty cycled HVAC&R equipment in the system.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a method for automatically controlling and managing energy consumption and operation of at least one load unit powered by electricity in an HVAC&R system to obtain a selected level of energy savings, comprising the steps of: intercepting an original equipment manufacturer (OEM) thermostat command signal in-route from a hysteresis thermostat to at least one HVAC/R load unit at an electronic controller device; sensing a first sensed signal representing an ON/OFF status of the at least one load unit of the HVAC&R system; sensing a second sensed signal representing an outside air temperature; sensing, optionally, a third sensed signal representing a conditioned space temperature; determining a first model parameter (A) and a second model parameter (B) using (1) the first and second sensed signals or (2) the first, second and third sensed signals, wherein the first model parameter (A) comprising thermal resistivity between the outside air and a conditioned space having a conditioned space temperature, and a thermal capacitance value of the conditioned space, and the second model parameter (B) comprising a heat transfer coefficient, and a thermal capacitance value of the conditioned space; estimating the (OEM) thermostat control signal over a moving time window using an energy control model, wherein the OEM thermostat control signal is estimated using a plant model module of the energy control model for a simulated hysteresis thermostat control of the at least one load unit of the HVAC&R system, wherein the plant model module incorporates the first model parameter (A) and the second model parameter (B); estimating an adjusted control signal based on the estimated OEM thermostat control signal comprising applying a time delay to the estimated OEM thermostat control signal; estimating a first energy consumption over the moving time window based on the estimated OEM thermostat control signal; estimating a second energy consumption over the moving time window based on the estimated adjusted control signal; estimating an energy consumption difference, normalized to the first energy consumption which is the estimated OEM signal energy consumption, between the first and second energy consumptions, to provide a calculated time delay feedback signal, wherein the calculated time delay feedback signal value drives the difference between the first and second energy consumptions normalized to the estimated OEM signal energy consumption to the selected energy savings setpoint value; adjusting the calculated time delay feedback signal with reference to an inputted selected normalized time delay setpoint signal to provide an adjusted time delay feedback signal; using the adjusted time delay feedback signal in the energy control model in estimating the adjusted control signal; and outputting the adjusted control signal generated by the electronic controller to a controller switch of at least one of the load units to control operation of the load unit, wherein the controller device replaces the intercepted thermostat command signal with the adjusted control signal while the thermostat command signal is calling for heating, cooling or refrigeration duty by the at least one load unit.

The present invention further relates to an electronic controller device for automatically controlling and managing energy consumption and operation of a duty cycled HVAC/R equipment to obtain a selected level of energy savings, comprising: at least one input connector for attaching at least one thermostat signal line and at least one output connector for attaching at least one signal line for outputting a control signal from the controller device to a load unit, wherein the controller device is capable of intercepting a thermostat command signal in-route to the load unit and replacing the thermostat command signal with an adjusted control signal that is outputted to the load unit for automatically controlling the load unit while the thermostat command signal is calling for heating, cooling or refrigeration duty by the load unit, wherein the adjusted control signal comprises alternating pulse on and pulse off cycles which have respective durations that are determined according to computations that are performed with at least one processor and at least one memory storing instructions, the instructions comprising one or more instructions which, when executed by the at least one processor, cause the at least one processor to access and implement an energy control model which performs the steps comprising: a)i) inputting a first sensed signal representing an ON/OFF status of at least one load unit of the HVAC&R system, ii) inputting a second sensed signal representing an outside air temperature of outside air, and optionally, iii) inputting a third sensed signal representing a conditioned space temperature; b) determining a first model parameter (A) and a second model parameter (B) using (1) the first and second sensed signals or (2) the first, second and third sensed signals, wherein the first model parameter (A) comprising thermal resistivity between the outside air and a conditioned space, and a thermal capacitance value of the conditioned space, and the second model parameter (B) comprising a heat transfer coefficient including thermal capacitance of the conditioned space, and a thermal capacitance value of the conditioned space; c) estimating an original equipment manufacturer (OEM) thermostat control signal over a moving time window using the energy control model, wherein the OEM thermostat control signal is estimated using a plant model module of the energy control model for a simulated hysteresis thermostat control of the at least one load unit of the HVAC&R system, wherein the plant model module incorporates the first model parameter (A) and the second model parameter (B); d) estimating an adjusted control signal based on the estimated OEM thermostat control signal comprising applying a time delay to the estimated OEM thermostat control signal; e) estimating a first energy consumption over the moving time window based on the estimated OEM thermostat control signal; estimating a second energy consumption over the moving time window based on the estimated adjusted control signal; f) estimating an energy consumption difference, normalized to the first energy consumption, between the first and second energy consumptions, to provide a calculated time delay feedback signal, wherein the calculated time delay feedback signal value drives the difference between the first and second energy consumptions normalized to the estimated OEM signal energy consumption to a selected energy savings setpoint value; g) adjusting the calculated time delay feedback signal with reference to an inputted selected normalized time delay setpoint signal to provide an adjusted time delay feedback signal; h) using the adjusted time delay feedback signal in the energy control model in estimating the adjusted control signal; and i) outputting the adjusted control signal generated by the electronic controller to a controller switch of at least one of the load units to control operation of the load unit.

The present invention further relates to a system for automatic control of an HVAC&R system to obtain a selected level of energy savings, comprising: a hysteresis (OEM) thermostat; at least one of load unit operably connected to a power supply line; a first temperature sensor for sensing an outside temperature and generating a sensed signal thereon; a second temperature sensor for sensing a conditioned space temperature and generating a sensed signal thereon; and the indicated electronic controller connected to a control signal line which connects the at least one load unit with the hysteresis thermostat.

The present invention further relates to a non-transitory computer readable storage medium storing instructions which, when executed by a computer, cause the computer to execute the indicated method.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

BRIEF DESCRIPTION OF DRAWINGS

FIG. 9 shows a calculation scheme that can be used to calculate the A parameter during the OFF state, according to an example of the present invention.

FIG. 11 shows a calculation scheme that can be used to calculate the B parameter, according to an example of the present invention.

FIG. 12 shows an illustration of the use of an Extended Kalman Filter (EKF) to estimate the A and B parameters, according to an example of the present invention.

DETAILED DESCRIPTION OF THE PRESENT INVENTION

Figure 1:
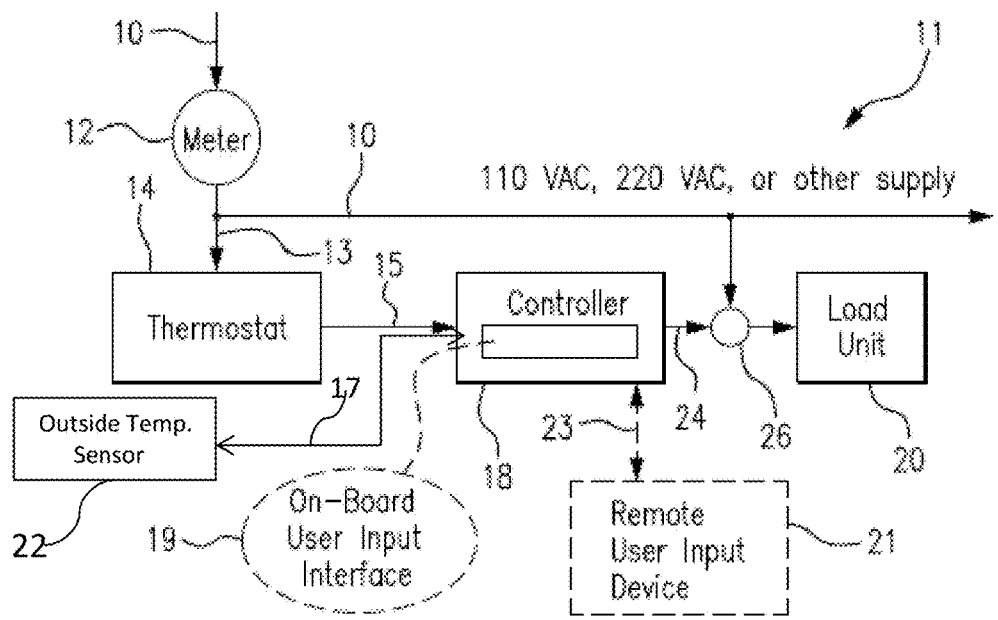
FIG. 1 is a block/schematic diagram of a HVAC&R system including an electronic controller according to an example of the present invention.

This invention relates to automated control of on/off heating, cooling, and refrigeration equipment under closed loop temperature and/or humidity control via hysteresis thermostat. This invention uses parameter estimation methods described herein to estimate parameters of a dynamic plant model of the hysteresis thermostat, the conditioned space, and the cooling, heating, or refrigeration equipment and then uses the model to create an equipment control signal that achieves a desired level of energy savings.

Energy savings can be achieved with the present invention by applying a calculated dynamically varying time delay to the Original Equipment Manufacturer (OEM) control signal (e.g., abbreviated herein as "uOEM") to produce an adjusted signal (e.g., abbreviated herein as "uPACE"). Since the actual equipment is controlled by the adjusted control signal ("uPACE"), the plant model is used to estimate the OEM control signal ("uOEM") control signal and its energy over a moving time window. An identical plant model, but including a time delay on the control signal, is used to estimate the adjusted control signal ("uPACE") control signal and its energy over an identical moving time window. The energy difference, normalized to the adjusted control signal energy ("uOEM energy"), is calculated and used as a feedback signal in an integral control algorithm (or similar) whose output is the time delay value. The feedback signal is controlled at a normalized energy savings setpoint (e.g., which can be set to any value between 0 and 1). The calculated time delay feedback signal value is designed to drive the difference between the first and second energy consumptions normalized to the estimated OEM signal energy consumption to a selected energy savings setpoint value.

The present invention provides an electronic controller which can be used to implement the indicated methods for estimating parameters of duty cycled HVAC&R equipment and the energy savings that can be obtained with use of adjusted control signals generated according to the present invention. The indicated controller can be implemented as part of a retrofittable electronic controller add-on device that includes integrated programs that can automatically and optimally calculate and control execution of duty cycles and cycle time durations for heating equipment, cooling equipment, and/or refrigeration equipment that are controlled using duty cycling to maintains a specified electrical demand level. The add-on electronic controller device can be installed in series in one or more thermostat control signal lines, which is capable of intercepting thermostat signals before they reach an intended load unit of an HVAC&R system. The electronic controller device can apply an algorithm to OEM signals and behavior thereof to generate an output signal for the load unit that can replace (or allow) the original control signal, to provide a selected energy savings level in the system. The controller can be implemented as a computer program stored in a memory device and executable with a microprocessor embodied by the electronic controller device. The program can provide a signal processing algorithm. The electronic controller device can include signal generation capability to output control signals from the controller device to the load unit. The electronic controller device can be readily retrofitted into an existing HVAC&R system, or incorporated into a new HVAC&R system.

FIG. 1 shows a HVAC&R system 11 including an electronic controller device 18 on which the indicated controller program or programs can reside and from which the program can be executed for signal processing and generation. The electronic controller 18 can be retrofitted in the system 11 to provide control of at least one HVAC&R load unit 20 that provides condition control in a zone 2. Power line 10 passes through utility meter 12 at the structure, wherein at least one load unit 20 to be controlled is located. Meter 12 measures usage and demand of electrical energy at that location. Load unit 20 can be, for example, an air conditioner, heat pump, furnace, refrigerator, boiler, or other load unit of a HVAC&R system. Operative main power line 10 generally is unconditioned, and supplies operative power to load unit 20 via load control switch 26, such as a relay, and typically other load units and appliances in the same structure (not shown). The power supply line 10 can be, for example, a 110 volts alternating current (VAC), or 220 VAC, or other mains power supply line powering the HVAC&R system 11 to be retrofit with the controller 18. The system 11 to be retrofit has at least one standard thermostat 14 connected to the HVAC&R load unit 20. Thermostat 14 can be connected via line 13 to power line 10. To simplify this illustration, a step-down transformer, such as 24 volt transformer, which may be used in powering the thermostat from power line 10, is not illustrated in this figure, but is illustrated in the wiring diagram shown in FIG. 14. The electronic controller device 18 also uses direct inputs from a dedicated outside temperature sensor 22 to operate and function as designed. The outside temperature sensor typically is located remotely from the thermostat 14. The thermostat 14 typically is located inside the building having a space to be temperature conditioned. The controller device 18 and the outside temperature sensor 22 can communicate via hardwire or wireless communication line 17. The outside temperature sensor can be a physically separate component from the controller device or alternatively can be integrated with the electronic controller device if the controller also is located outside. Electronic controller device 18 is not directly powered from power line 10, and it does not need to be. Electronic controller device 18 is powered by the thermostat signaling intended for the load device(s). The electronic controller device 18 typically is electrically dormant (or inactive) or sleeps with respect to its signal processing features until receiving/intercepting an ON signal from the thermostat, and then controller device 18 becomes awakened (active) to apply a program as part of an algorithm such as shown herein for signal control processing and control signal generation to the intended load device(s).

In one typical situation, a control signal line 15 of thermostat 14 can transmit an AC voltage of 24 volts during the periods when a thermostatic control is, for example, calling for cooling from an air conditioning unit (load unit), or heating from an electric furnace, and so forth. The control signal would normally activate load control switch 26 in main power line 10 to power the load unit 20. That is, in the absence of electronic controller device 18, control signal line 15 would be in control of opening or closing load unit control switch 26, and thereby opening or closing the circuit of operative power line 10 and controlling the flow of operative power to load unit 20. The electronic controller device 18 is interposed and installed in the thermostat control signal line 15 in series at some point between thermostat 14 and the load unit control switch 26. As shown, thermostat line 15 can be cut and connected at one cut end to electronic controller device 18. As also shown, the remaining portion of the cut signal control line, referenced as line 24, can be connected at one end to electronic controller device 18 and at the other end to load control switch 26.

The electronic controller device 18 can be physically mounted, for example, in sheet metal (not shown) near the load unit 20, such as a standard sheet metal construction enclosure used with the load unit. Preferably, this tapping of controller device 18 into the control signal line 15 (24) is made as close as practically feasible to the load control switch 26. Usually it can be possible to make the connection within the physical confines of the load unit itself. The connection of electronic controller device 18 in the control signal line could be made, for example, within the casing containing the compressor unit of a residential air conditioning unit. For example, the electronic controller device 18 could be mounted in a sheet metal enclosure that houses the OEM controls for a compressor of an air conditioning unit as installed on a slab or platform near ground level immediately adjoining a home or building supported by the unit, or on a rooftop thereof. Electronic controller device 18 can include on-board user interface controls 19 and/or can receive control inputs and/or parameter data 23 from a remote input device 21, which can be further understood by other descriptions herein that will follow. The input device 21 can be "remote" in the sense that it is a physically separate device from electronic controller device 18, which can communicate with the controller, such as via an attachable/detachable communication wire or cable link or a wireless communication link. The remote input device 21 can be an electronic service tool for the controller, a laptop computer, a desktop computer, a tablet computer, a smartphone, or other device. The outside temperature sensor 22 can be located as a separate unit, or as integrated with the controller (if also located outside), near a compressor of an air conditioning unit or other load unit to be controlled as installed on a slab or platform near ground level immediately adjoining and outside a home or building supported by the unit, or on a rooftop thereof, or located elsewhere in the close vicinity of the home or building supported by the unit.

In operation, electronic controller device 18 receives electrical flow over control signal line 15 based on a thermostat control signal intended for powering up the load unit 20, and electronic controller device 18 can immediately awaken to intercept the thermostat signal and initiate its suite of control programs before an output control signal is sent from the electronic controller device 18 to the load unit switch 26. As indicated, the output control signal may be a replacement signal for the OEM signal or the OEM signal, depending on the outcome of the running of the controller's algorithm.

The thermostat 14 preferably is (pre)configured to generate only an ON/OFF signal, by which the air conditioner/heat pump compressor, furnace, or other load unit is turned on/off. Preferably, the thermostat 14 used in the system 11 is designed to provide ON/OFF control at a load unit to turn the load unit completely on or completely off. When the thermostat is an ON/OFF control device, the thermostat can decide if the output needs to be turned on, turned off, or left in its present state. ON/OFF control by an OEM thermostat typically comprises selecting a set point, and a native or default OEM deadband may apply or may be selected by a user, that straddles the set point.

Outside temperature sensor 22 can be located near locations of the load unit 20 outside the structure including at least one space that is being temperature controlled. Remote temperature sensor 22 can be a sensing module that can be plugged via integral multiple prongs into an outside electrical outlet accessing the power line 10 and/or can be battery powered. The outside temperature sensor 22 can be part of a device that is directly plugged into an outside outlet, or can be connected to an outlet as a module to the outlet via a power cord or power extension cord. The outside temperature sensor may be included in a battery powered unit.

Though FIG. 1 shows a single control line 15 cut and connected from a single thermostat 14 and connected to the electronic controller device 18 for simplification, it will be appreciated that in single or dual thermostat configurations, multiple control lines from a single thermostat, or a single control line from each of multiple thermostats each can be cut and separately connected to the electronic controller device 18, such as different respective input pins of the electronic controller. Where the electronic controller device 18 controls more than one load device, an output signal control line can be connected at one end to electronic controller device 18 and at the other end to the load control switches of each load device. For example, although only one load unit 20 under the load control and management of electronic controller device 18 in a single control signal line is shown in the HVAC&R system 11 of FIGS. 1 and 14 for simplification, the HVAC&R system 11 can include multiple individual loads under thermostat control, such as, for example, multiple compressors, or a compressor unit and a blower, and other similar or diverse loads, depending on the configuration. As indicated, the electronic controller of this invention can be wholly connected in the control lines of individual subloads of the equipment. In other words, an air conditioner may have a separate control line for the subloads of the compressor unit and the blower unit. The electronic controller can be used to control either one or both of these subloads. The overall power line to all the subloads of the air conditioning unit is generally not in any way altered by the electronic controller of this invention. Further, the usual conventional electrical grounding means is not shown in the schematic diagram of FIG. 1 as it is not a matter of particular concern in this invention.

The electronic controller device 18 of FIG. 1, for example, can be implemented in a stand-alone configuration or in networked configuration. A stand-alone configuration can be used, for example, in a single load unit residential application (e.g., <about 5 ton HVAC&R load unit). A networked configuration can be used, for example, as part of a building management system (BMS) for providing HVAC&R in a larger scale applications, such as higher energy use/demand residential, commercial or industrial buildings or equipment, and the like, or, as a network of electronic controllers, each attached to a dedicated load unit.

The electronic controller device 18 in FIG. 1 includes at least one microprocessor operable to receive thermostat input signals, apply the indicated programs to thermostat signals received, and transmit an output signal under the command of the microcontroller to the HVAC&R load unit to be controlled.

Figure 2:
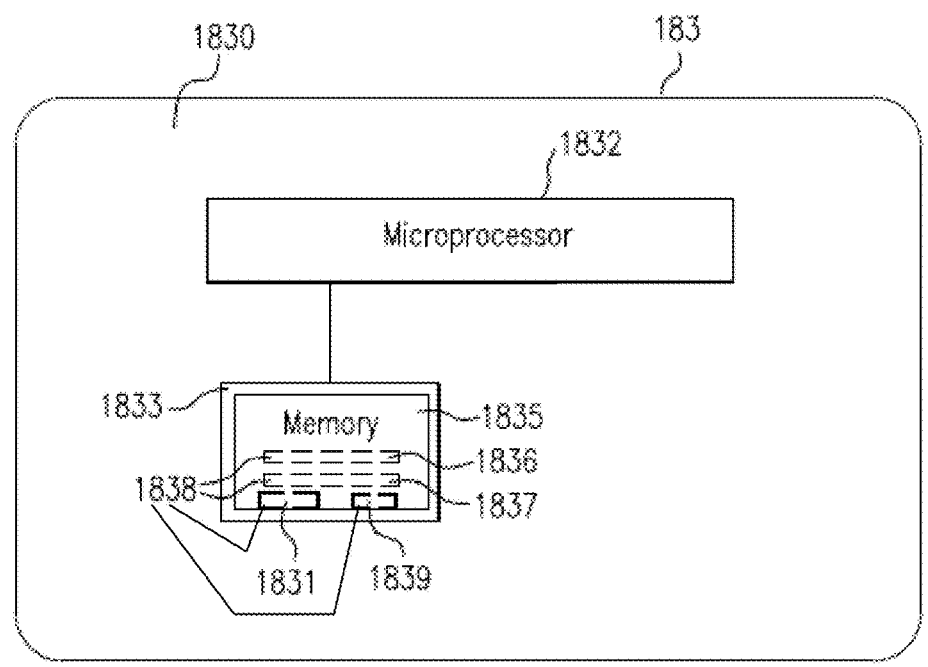
FIG. 2 is a process block diagram of a microcontroller of the electronic controller of FIG. 1 according to an example of the present invention.

As shown in FIG. 2, the microcontroller 183, which is included in controller device 18 in FIG. 1, can include, for example, a microprocessor for storing and executing the indicated the indicated controller program, as well as performing data collection function, controlling signal generation to the load device(s), and calculating the estimated electrical savings. As shown in FIG. 2, microcontroller 183 can include a microprocessor 1832, a computer-readable storage medium 1833 shown as incorporating memory 1835, which all have been integrated in the same chip. Microprocessor 1832, also known as a central processing unit (CPU), contains the arithmetic, logic, and control circuitry needed to provide the computing capability to support the controller functions indicated herein. The memory 1835 of the computer-readable storage medium 1833 can include non-volatile memory, volatile memory, or both. Computer-readable storage medium 1833 can comprise at least one non-transitory computer usable storage medium or memory storage device. The non-volatile memory can include, for example, read-only memory (ROM), or other permanent storage. The volatile memory can include, for example, random access memory (RAM), buffers, cache memory, network circuits, or combinations thereof. The computer-readable storage medium 1833 of the microcontroller 183 can comprise embedded ROM and RAM. Programming and data can be stored in computer-readable storage medium 1833 including memory 1835. Program memory can be provided, for example, for the energy control algorithm controller program 1838, which includes such as the energy control main program 1836, plant model controller program 1837, delay calculation controller program 1831, and energy calculation controller program 1839, and as well as store menus, operating instructions and other programming such as indicated herein, parameter values and the like, for controlling the controller device 18. These programs can be stored in ROM or other memory. In combination, the programs provide an integrated control program 1838 residing on controller device 18. Data memory, such as FLASH memory, can be configured with data parameters. Memory can be used to store data acquired that is related to the operation of a load device to be controlled, such as thermostat command on times and calculated off times. The microprocessor 1832 and memory 1833 can be integrated and supported on a common mother board 1830, or the like, which can be housed in an enclosure (not shown) having input and output connection terminal pins, a communication link/interface connector port(s) (e.g., a mini-, or micro- or standard-size USB port for receiving a corresponding sized USB plug), and the like, which are discussed further with respect to FIG. 14.

Microcontroller 183 can be, for example, an 8 bit or 16 bit or larger microchip microprocessor including the indicated microprocessor, and memory components, and is operable for input and execution of the indicated demand regulator controller program, and other included programs. Programmable microcontrollers can be commercially obtained to which the control program indicated herein can be inputted to provide the desired control. Suitable microcontrollers in this respect include those available from commercial vendors, such as Microchip Technology Inc., Chandler, Ariz. Examples of commercially available microcontrollers in this respect include, for example, the PIC16F87X, PIC16F877, PIC16F877A, PIC16F887, dsPIC30F4012, and PIC32MX795F512L-801/PT, by Microchip Technology, Inc.; Analog Devices ADSP series; Jennic JN family; National Semiconductor COP8 family; Freescale 68000 family; Maxim MAXQ series; Texas Instruments MSP 430 series; and the 8051 family manufactured by Intel and others. Additional possible devices include FPGA/ARM and ASIC's. The demand regulator controller program indicated herein can be inputted to the respective microcontrollers using industry development tools, such as the MPLABX Integrated Development Environment from Microchip Technology Inc.

Though the controller device 18 is illustrated in FIG. 1 as a stand-alone unit tapped into the thermostat signal line 15 (24) to the load unit to be controlled, the indicated microelectronics of the controller optionally may be incorporated and integrated into the thermostat unit or a Building Management System (BMS). An algorithm incorporating the demand regulator controller program, and other indicated control programs and features of the electronic controller device can be added to native thermostat signal control software of the thermostat, or can be added to Building Management System (BMS) software where a BMS provides control to the load unit or units of the HVAC&R, eliminating a need for a physically separate electronic controller device. In the combined thermostat/electronic controller arrangement, the interception of the OEM thermostat signal and processing thereof by the controller microelectronics can occur at the modified thermostat unit without the need for a physically separate microelectronic controller being tapped into the thermostat signal line 15 (24) between the thermostat and the load unit to be controlled.

Functions of the controller and other features of the process control logic and calculation schemes which can be used in methods of the present invention for energy control and savings estimates such as illustrated in FIGS. 3-13, which can be implemented using software that is executable with the indicated microprocessor of an electronic controller of the present invention.

Figure 3:
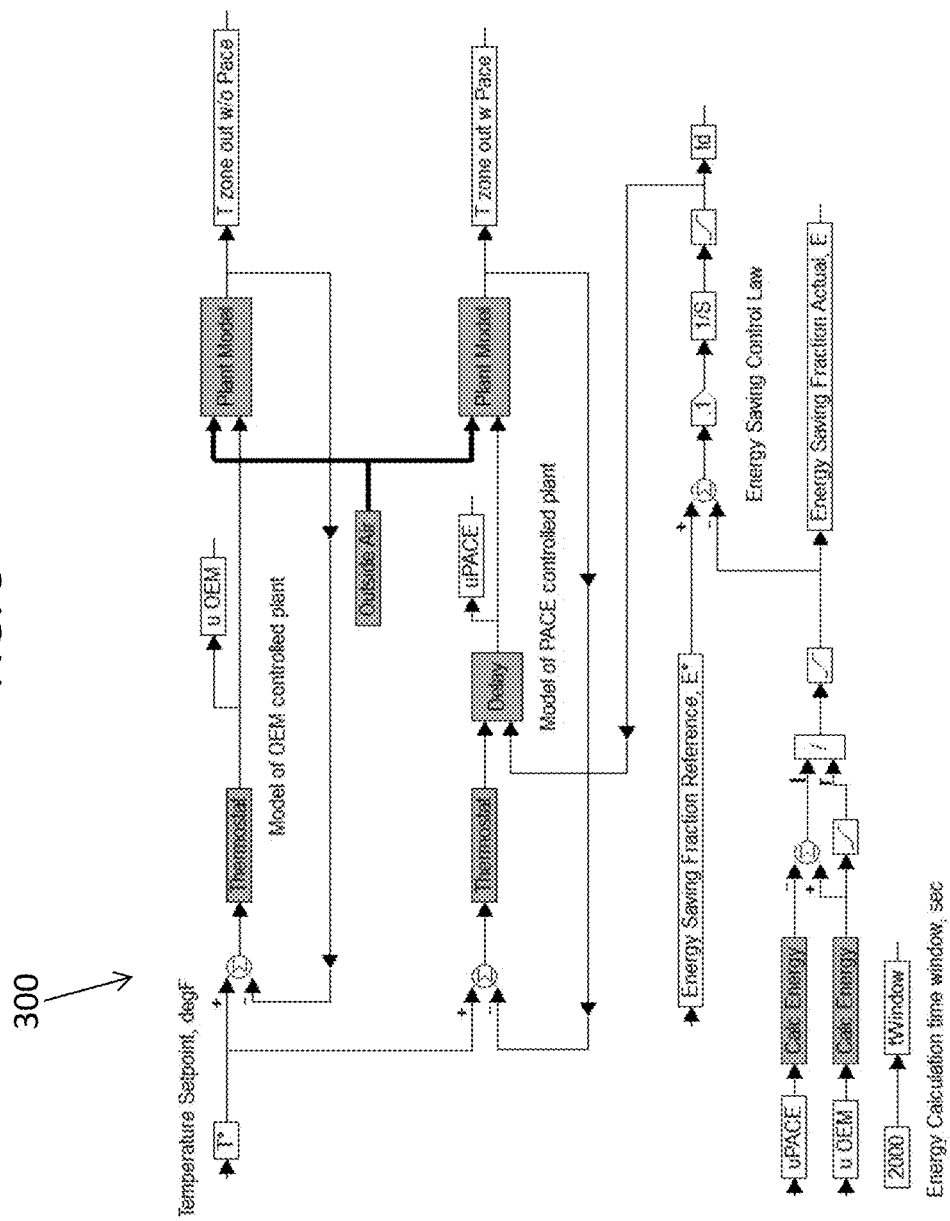
FIG. 3 is a process block diagram of process control logic of an energy control algorithm, which can be used by an electronic controller for automatic energy control and energy savings estimations for a HVAC&R system according to an example of the present invention.
Figure 4:
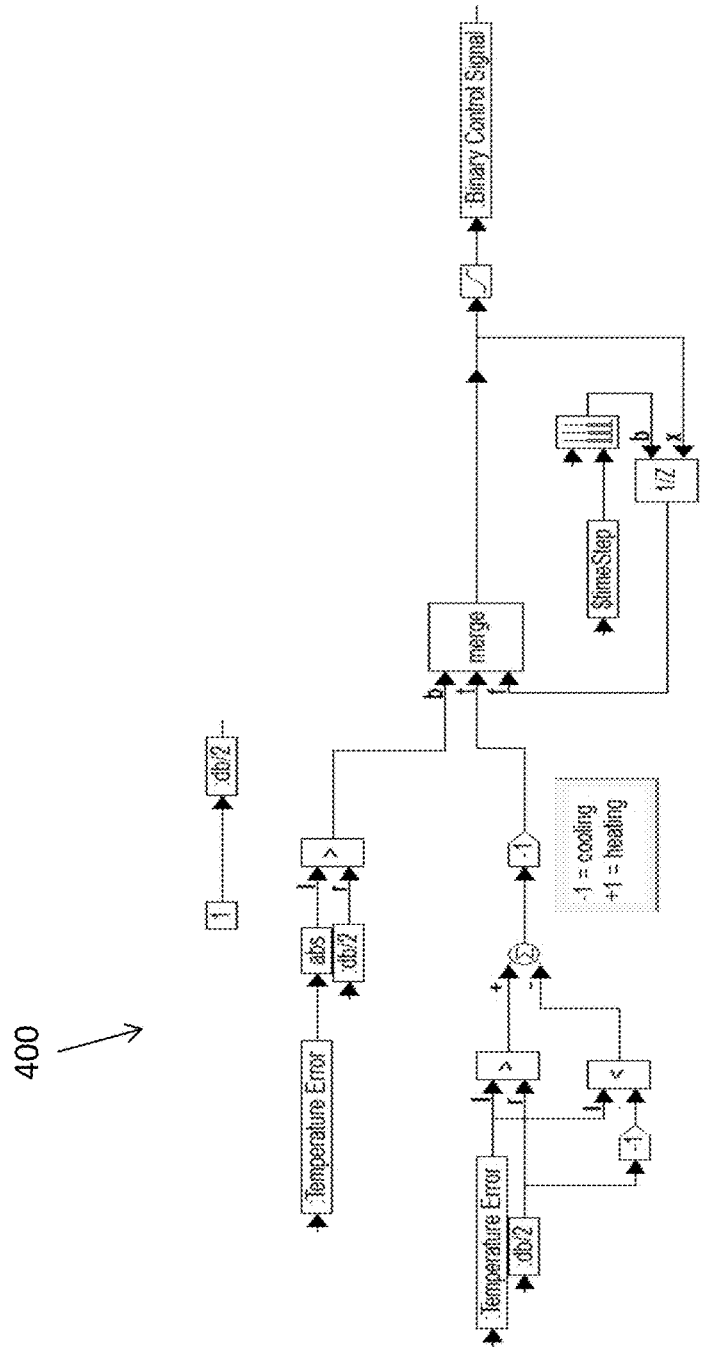
FIG. 4 is a process block diagram of process control logic used to determine a general hysteresis thermostat signal that can be used for heating or cooling, according to an example of the present invention.
Figure 5:
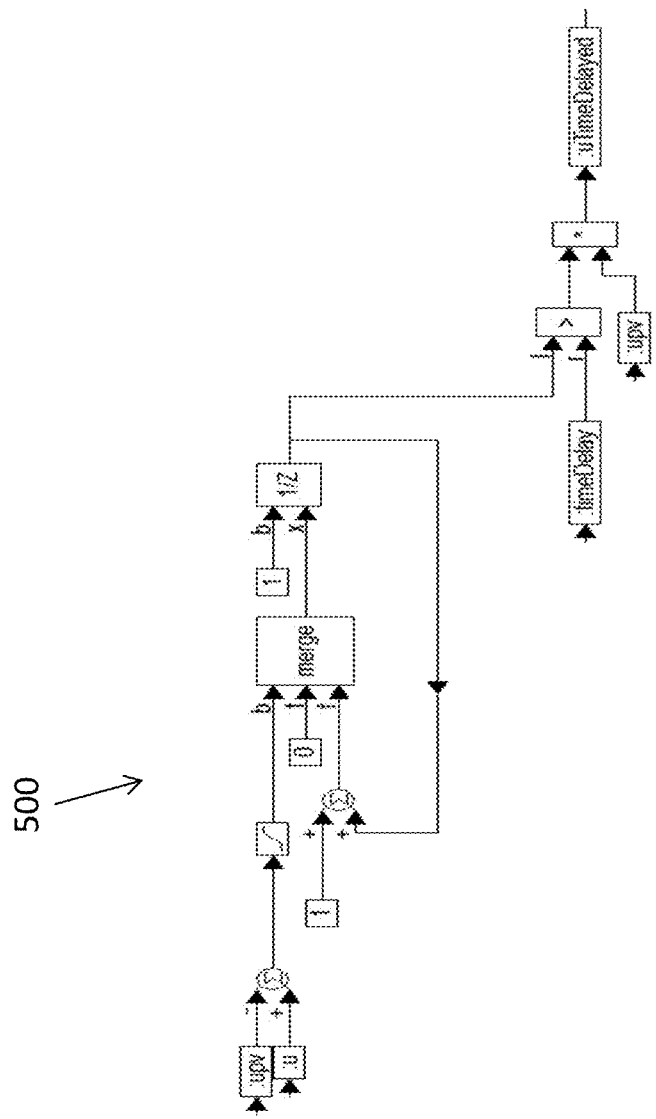
FIG. 5 is a process block diagram of process control logic which applies a time delay to an input signal, i.e., a hysteresis signal determined using the process of FIG. 2, to produce a control signal ("uPace") which is used in the process of FIG. 1, according to an example of the present invention.
Figure 6:
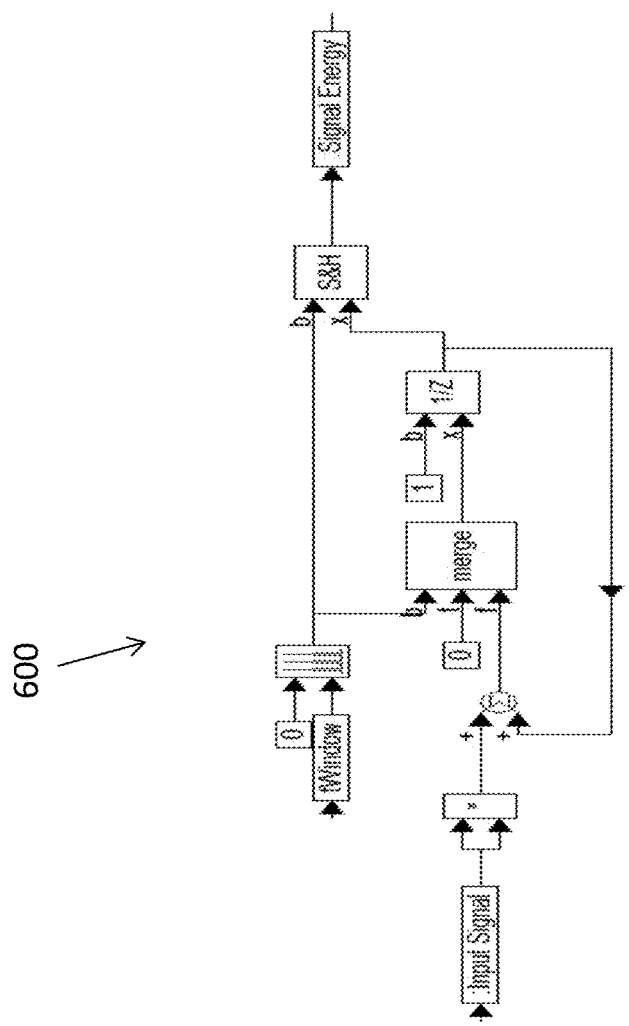
FIG. 6 is a process block diagram of process control logic for an energy calculation ("Calc energy") which is used in the process shown in FIG. 1, according to an example of the present invention.

FIG. 3 shows process control logic of an energy control algorithm, which is identified by numeral 300, which can be applied by an electronic controller of the present invention to provide automatic energy control and energy savings estimations for a HVAC&R system. In FIG. 3, the uOEM and uPACE control signals are produced using the estimated plant model description for a hysteresis thermostat only. A block diagram is presented in FIG. 4 of a general hysteresis thermostat, which is identified by numeral 400, which can be used for either heating or cooling. In FIG. 4 (and FIGS. 5 and 6), the "Merge" block represents if-then-else logic with regard to the b, t, and f inputs and x output. In FIG. 3, the uPACE control signals are produced by the "Delay" block. This block applies a time delay (second input on left) to the input signal (first input on left) using the logic presented in FIG. 5. The process logic in FIG. 5 is identified by numeral 500. In the "Delay" block shown in FIG. 5, the "u" signal is the input signal and the "upv" signal is a delayed value of the "u" signal. When the difference between "u"–"upv" is positive, the input signal has transitioned from its 0 to 1 state (OFF to ON). When this occurs, the feedback loop calculates an elapsed time and when this elapsed time>"timeDelay", the output signal "uTimeDelayed" turns ON. To prevent the timer from delaying when the input signal transitions from 1 to 0 (ON to OFF), the "uTimeDelayed" signal is multiplied by the "upv" signal.

In FIG. 3, the block titled "Calc Energy" calculates the signal energy for either the uOEM or uPACE signals. A block diagram of this block is presented in FIG. 6, wherein the process logic of this block is identified by numeral 600. The "tWindow" value is globally set as the moving window width, for illustration purposes, this was set to 2000 seconds, however, it can be set to any value, obviously, larger values will require more time to calculate. A single energy calculation is made then every tWindow seconds. The S&H block in FIG. 6 samples and holds the calculated energy every tWindow seconds.

In FIG. 3, the "Energy Saving Fraction Actual, E" signal is the energy difference of the uOEM signal minus the uPACE signal normalized to the uOEM signal energy. In situations where the uPACE signal energy is less than the uOEM signal energy, the difference will be positive and will lie between 0 and 1. The "Energy Saving Fraction Reference, E*" signal represents a desired energy saving that is sought to be achieved. The "Energy Saving Control Law" is an integral controller operating on the error signal created by subtracting the "Energy Saving Fraction Actual, E" signal from the "Energy Saving Fraction Reference, E*" signal. The integral control law will reduce the error signal to zero by adjusting the time delay signal, "td", whatever value is required for the uPACE controlled model to achieve the "Energy Saving Fraction Reference, E*". The desired or selected value of Energy Saving Fraction Reference, E*, can be inputted to the controller by a user, such as via the on-board user input interface or remote user input device indicated in the discussion of FIG. 1.

Figure 7:
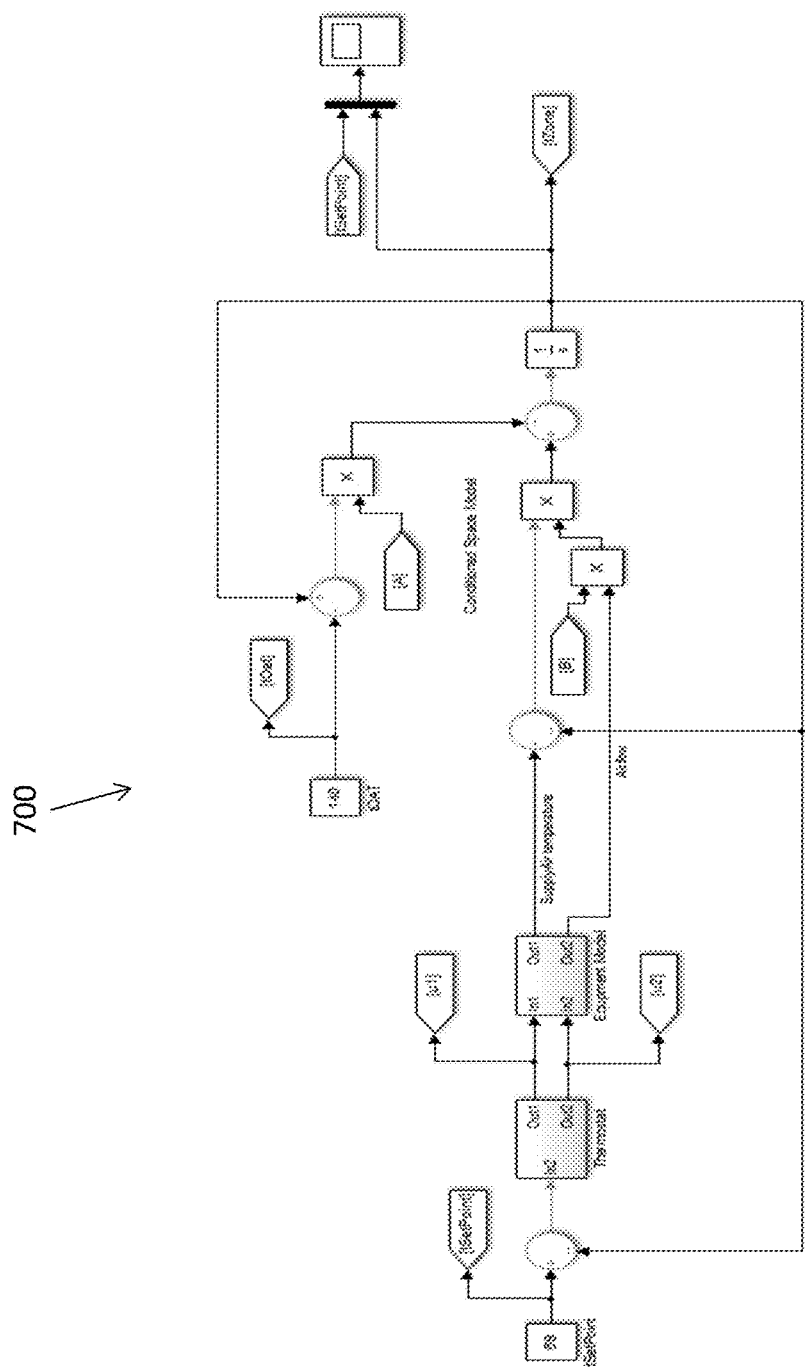
FIG. 7 is a process block diagram of process control logic of the "Plant Model" in FIG. 1, which models the dynamics of a forced air heating, cooling, or refrigeration system under hysteresis thermostat control, according to an example of the present invention.
Figure 8:
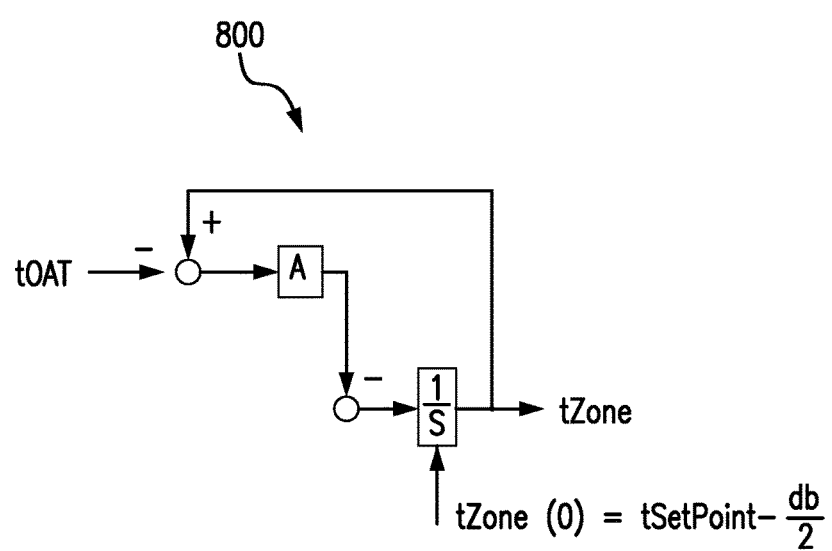
FIG. 8 is a process block diagram of the Plant Model of FIG. 7 during an OFF state, according to an example of the present invention.
Figure 10:
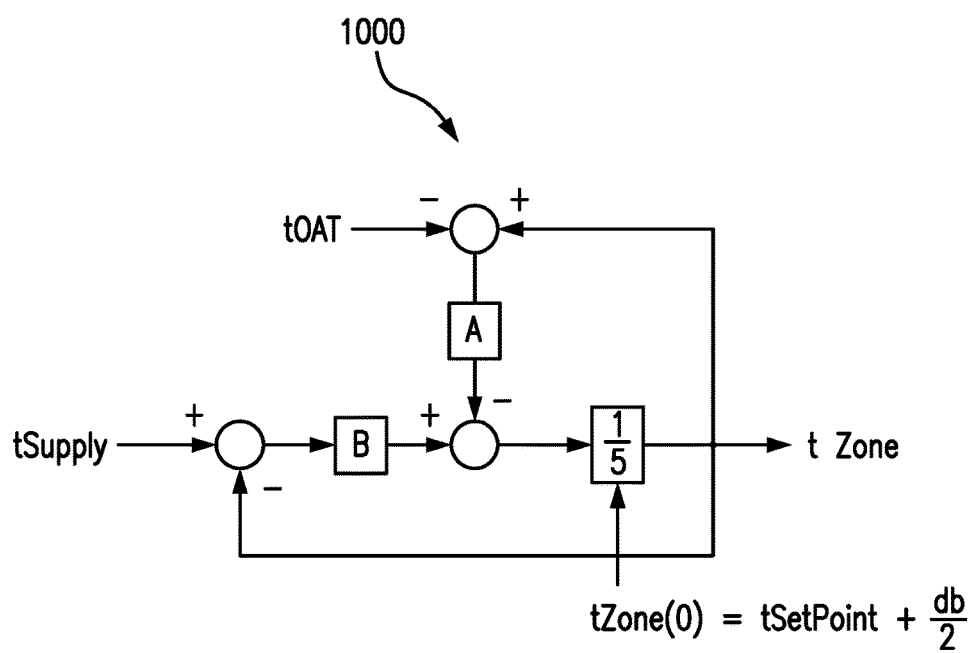
FIG. 10 is a process block diagram of the Plant Model of FIG. 7 during an ON state, according to an example of the present invention.

FIG. 7 shows process control logic of the "Plant Model" module shown in FIG. 3, which models the dynamics of a forced air heating, cooling, or refrigeration system under hysteresis (OEM) thermostat control. This process control logic, which is identified by numeral 700 in FIG. 7, is applied by the indicated electronic controller according to an example of the present invention. The following terms shown in FIG. 7 are defined as follows: tOAT=outside air temperature; tSetPoint=thermostat setpoint temperature; u1=thermostat control signal to compressor or burner (ON or OFF); u2=thermostat control signal to blower (ON or OFF); Supply Air Temperature=Conditioned space register entry temperature; Airflow=Conditioned space register entry airflow (equipment nameplate value); tZone=zone (conditioned space) temperature; A=Thermal resistivity between the conditioned space and outside air (includes the zone thermal capacitance); and B=Heat transfer coefficient (includes the zone thermal capacitance).

A and B are the two parameters that describe the operation of a forced air on/off heating, cooling, and refrigeration equipment under closed loop temperature and/or humidity control via hysteresis thermostat. These parameters vary over time based on load, ambient, and setpoint changes, however, if they are known, energy and power consumptions can be accurately calculated. Two methods for estimating A and B are illustrated herein, which are referred to herein as "Method 1" and "Method 2."

In both methods, the "Supply Air Temperature" can be assumed to be 15 degrees less than the zone temperature for cooling applications. For heating applications, the "Supply Air Temperature" can be assumed to be 15 degrees greater than the zone setpoint temperature. This estimate is not critical to the parameter estimation process. When the FIG. 3 system is under on/off thermostat control, both the blower and compressor (or heating coil) are controlled in either of two states; ON or OFF. In the OFF state, the B value becomes 0 because the airflow has been turned OFF by the thermostat.

Method 1: Method 1 estimates the two model parameters, A and B, using two sensed signals, the Outside Air Temperature and the On/Off status of the equipment. The following information is provided: type of application: heating, cooling, or refrigeration. The following assumptions are made: (i) the thermostat deadband is +/−1° F., the setpoint for cooling is 72° F., for heating is 68° F., and for refrigeration is 40° F. (these values can be changed but they are assumed to not be directly measurable). During the OFF state, the plant model is presented in FIG. 8, and which is identified therein by numeral 800. Using the assumptions, given information, and the sensor information, the A parameter can be calculated during the OFF state using a calculation scheme shown in FIG. 9 and identified by numeral 900. If only the outside air temperature and OFF time values are known, reasonable values can be selected for the zone temperature and deadband (based on the application type: cooling, heating, or refrigeration) and the A parameter can be estimated. The tZone(k) value is set to tZone(0)=tSetPoint−db/2. Similarly, considering the same cooling application in the ON state, the block diagram for the ON operation is presented in FIG. 10 and identified by numeral 1000. Using the assumptions, given information, and the sensor information, and the previously computed A parameter (which remains fixed during this calculation), the B parameter can be calculated as shown by the calculation scheme in FIG. 11 and identified by numeral 1100. If thermostat deadband, zone temperature, outside air temperature, and ON time values are known, the B parameter can be calculated exactly. If only the outside air temperature and ON time values are known, reasonable values can be selected for the zone temperature and deadband (based on the application type: cooling, heating, or refrigeration) and the B parameter can be estimated. As data is collected from the outside air temperature, the ON time, the OFF time, and (optionally) the zone temperature and the thermostat deadband, the A and B parameters can be dynamically refined.

Method 2: For this method, there are three available sensor signals for the estimation of the A and B parameters, which are the Outside Air Temperature, the On/Off Status of the Equipment, and the zone temperature. The following information is provided for this method: type of application: heating, cooling, or refrigeration. This approach uses an Extended Kalman Filter (EKF) to estimate the A and B parameters. However, any recursive estimation approach could be used (e.g., EKF, least squares, neural networks, fuzzy logic, observer, or other estimation methods). The differential, difference, state, and partial equations which can be used to implement the EKF are shown in FIG. 12 and identified by numeral 1200. A computer software implementation of the EKF algorithm, using the equations shown in FIG. 12, can be used to estimate the A and B parameters for this method. Initially assumed A and B parameter values used in the first iteration of the calculations can be arbitrary preselected values.

Figure 13:
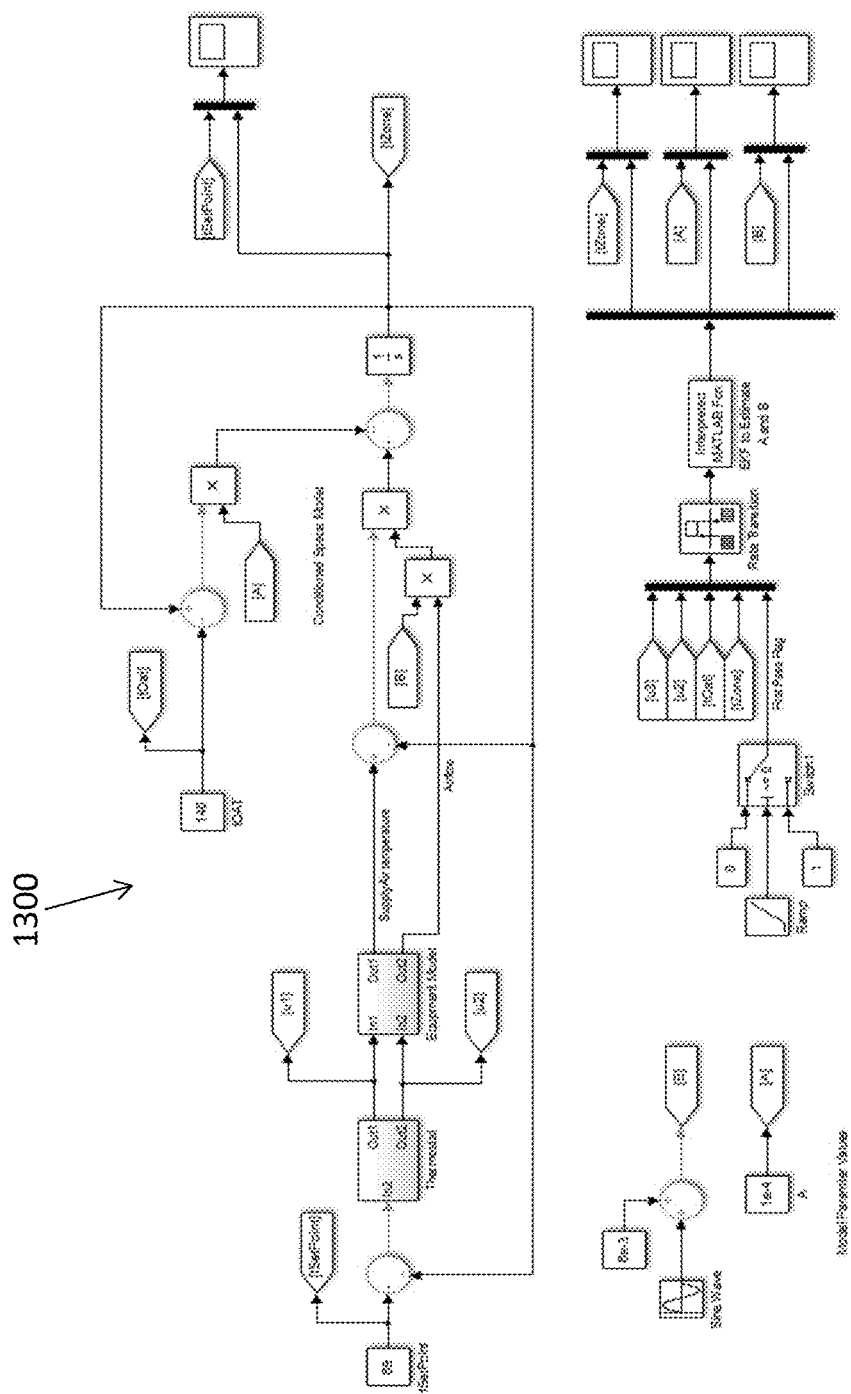
FIG. 13 is a process block diagram of the Plant Model with Extended Kalman Filter (EKF) used as a method for estimation, according to an example of the present invention.

An illustration of the plant model with EKF according to indicated Method 2 is shown in FIG. 13 and is identified by numeral 1300. As described in examples included herein, the performance of the EKF can be validated using measurement signal data from this Plant model simulation. The EKF receives three measurement signals from the plant; tOAT, compressor and blower commands, and tZone and estimates the A and B parameters. The true A and B parameter values are embedded in the Plant model. As shown in the examples included herein, the EKF performance is able to rapidly and accurately estimate the values of the A and B parameters.

As indicated by the discussions of FIGS. 3-13, this present invention (1) can achieve energy savings by applying a calculated dynamically varying time delay to the OEM control signal ("uOEM") to produce an adjusted control ("uPACE"), which is applied to the equipment to be controlled, and (2) estimates the energy saved using the adjusted control in place of the OEM control. As indicated, an overall configuration of the energy controller is presented in FIG. 3. Since the equipment can be controlled by the adjusted control signal ("uPACE" control signal), the indicated plant model can be used to estimate what the thermostat control signal ("uOEM" control signal) would have looked like had the plant been controlled by it. As indicated, this is achieved by sensing the zone temperature and the outside air temperature, and the energy present in the uOEM signal is then calculated over a moving time window. As also indicated, an identical plant model but including a time delay on the control signal is then used to estimate the uPACE control signal, and the energy present in the uPACE signal can be calculated over the same moving time window. The energy difference, normalized to the uOEM energy, is calculated and used as a feedback signal in the indicated integral control algorithm whose output is the time delay value used to create the uPACE signal. The feedback signal is controlled at a normalized energy savings setpoint (which can be set to any value between 0 and 1).

Figure 14:
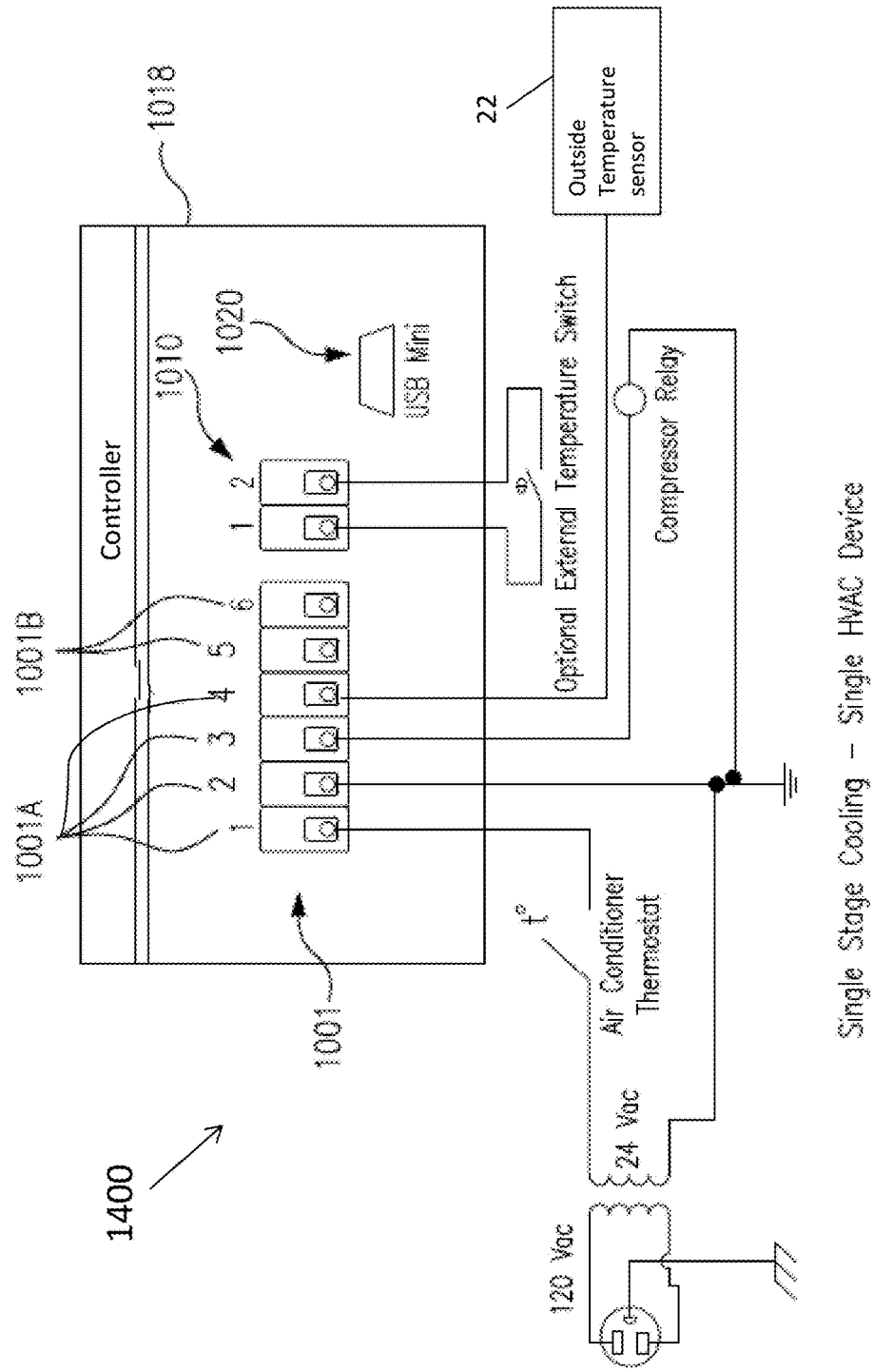
FIG. 14 is an electrical connection diagram for a single stage cooling application using an electronic controller according to an example of the present invention, wherein this configuration is shown as used when a single thermostat is used to control one HVAC cooling device (e.g., a compressor).

The wiring terminations for an example of an installation configuration of an electronic controller of the present invention is presented with reference made to FIG. 14. FIG. 14 shows an electrical connection diagram 1400 for a single stage cooling application using an electronic controller device according to an example of the present invention. This configuration can be used when a single air conditioner thermostat is used to control one HVAC cooling device (a compressor). This configuration also supports thermostats that provide a manual switch to select either heating or cooling operation. The compressor can be a compressor suitable for use in vapor-compression cooling/refrigeration systems. The compressor can include an electric motor (not shown), used to drive the compressor. The electric motor itself can be a conventional electric motor or other suitable electric motor used or useful for driving such load units.

In the example shown in FIG. 14, the electronic controller device 1018 provides two independent control channels that may be wired to support different equipment configurations. Referring to the first pin module 1001, the first channel 1001A comprises one of pins 1-4, and the second channel 1001B comprises one of pins 5-6 thereof. Output lines to the load unit(s), e.g., a cooling unit compressor, are shown as extending from one of pins 1-3. Pin 4 can be used for hardwire input of outside temperature signals transmitted from a sensor 22 located outside the building in which a space is being temperature conditioned. As indicated, the outside temperature sensor 22 alternatively can communicate with the controller 1018 via a wireless connection therewith, and/or can be integrated with the electronic controller if the controller also is located outside (not shown). In addition, the controller provides a separate "dry contact" input channel that may be used for remote control of the controller, such as by an existing BMS system. Referring to the second pin module 1010, pins 1-2 thereof can be used for this dry contact input module. A communication port 1020 is shown in these figures as a mini-USB port (e.g., a camera size USB port) but is not limited thereto. A service tool, computer, smartphone or other device (not shown) can be used to import/input parameters, and the like into the electronic controller device 1018 by making a communication link with the controller via port 1020. The electronic controller device 1018 can have the indicated controller programs preloaded into the controller on-board memory during its assembly and before installation in the field.

The thermostat (e.g., an OEM thermostat) which can be used with the electronic controller device of the present invention, such one having the wiring configuration shown in FIG. 14 or another configuration, can deployed at some point in a building and senses the temperature of the ambient air and if it is higher than the comfort setting which has been selected, sends a signal to activate the air conditioning unit. As indicated, in the present invention, the electronic controller device intercepts the thermostat signal, which powers up the electronic controller device to process the signal according to the programmed algorithm of the controller before sending a controller-processed output signal to the load unit. The air conditioning unit typically comprises the compressor, and a condenser and evaporator connecting with each other in a closed refrigerant system (not shown). The refrigeration cycle itself is well known (e.g., see, U.S. Pat. No. 4,094,166, which is incorporated herein by reference in its entirety). Basically, gaseous refrigerant is delivered from the compressor to the condenser coil where it gives up heat and then is passed through an expansion valve to the evaporator coil where it absorbs heat from the circulating air which is passed thereover by the evaporator fan. When the thermostat senses that the ambient air has been cooled to the selected level, the thermostat goes to an off state to turn off the compressor, evaporator fan and condenser fan until the ambient temperature has again reached the level where further cooling is necessary. As indicated, the electronic controller device of the present invention goes to sleep when the thermostat stops signaling the load unit, until the next power on signal is sent by the thermostat to the same load unit which, as indicated, will be intercepted by the electronic controller device which powers up the electronic controller device to process the signal according to its programmed algorithm before sending a controller-processed output signal to the load unit. As indicated, a deadband typically is applied to the control temperature setting at the thermostat, which deadband effectively can be modified by the electronic controller device to improve demand savings in a controlled manner.

The indicated pin assignments for the first channel 1001A and second channel 1001B that are identified in FIG. 14 can apply in similar pin module for other types of load units of an HVACR system, such as a dual stage cooling unit, a heating unit (e.g., gas, electric, heat pump), a boiler, and so forth. Other aspects of an electrical connection configuration that can be used in these other types of load units can be readily adapted and implemented as applicable.

In these manners, for example, an electronic controller device having the indicated demand regulator controller is operable to intercept and process a thermostat's control signal with an algorithm that can automatically generate enhanced control signals to provide energy and savings control. Amongst other benefits and advantages, existing HVAC&R systems, for example, can embody the present controller such as illustrated herein to improve energy consumption and reduce energy costs of heating, cooling, and refrigeration equipment.

The present invention will be further clarified by the following examples, which are intended to be exemplary of the present invention.

EXAMPLES

Example 1

Performance of the plant model with Extended Kalman Method (EKF) in indicated Method 2 to estimate the model parameters A and B was evaluated as follows. The EKF used in this method was tested using measurement signal data from the Plant model simulation shown in FIG. 13. A computer software program which embodied the equations shown in FIG. 12 was used for this simulation. The EKF received three measurement signals from the plant in the simulation, which were tOAT, compressor and blower commands, and tZone, and estimated the A and B parameters. The true A and B parameter values are embedded in the Plant model. Two tests are conducted, one using constant values for the true A and B parameters, the other using a constant A and varying B parameters to model heating load variations in the zone. The EKF performance was judged on its ability to rapidly and accurately estimate the values of these two parameters.

Figure 15A:
FIG. 15A is a plot showing Extended Kalman Filter (EKF) estimated values of Parameter A and the actual value when the simulation model was configured with A and B set to constant values, according to an example of the present invention.
Figure 15B:
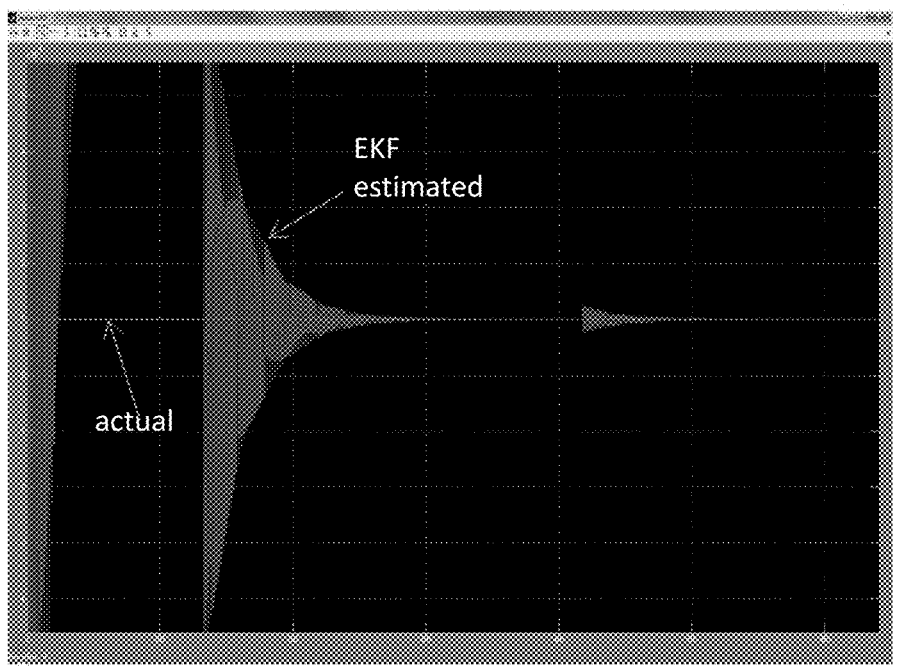
FIG. 15B is a magnified view of the left-side portion of the plot of FIG. 15A showing the (Extended Kalman Filter) EKF estimated values of Parameter A and the actual value, according to an example of the present invention.
Figure 16A:
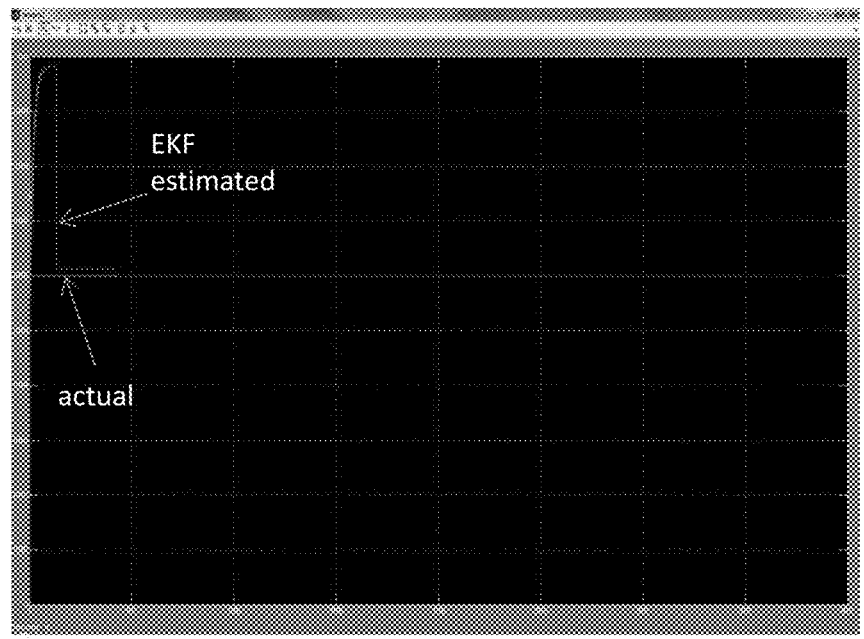
FIG. 16A is a plot showing (Extended Kalman Filter) EKF estimated values of Parameter B and the actual value when the simulation model was configured with A and B set to constant values, according to an example of the present invention.
Figure 16B:
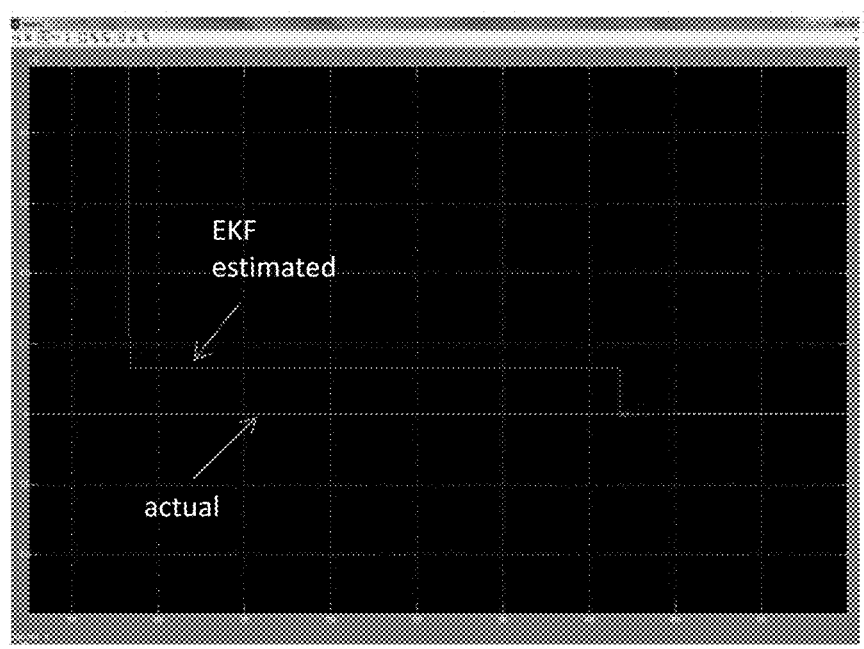
FIG. 16B is a magnified view of the left-side portion of the plot of FIG. 16A showing the (Extended Kalman Filter) EKF estimated values of Parameter B and the actual value, according to an example of the present invention.

In Test 1: The simulation model was configured with A and B set to constant values; A=1e-4 (i.e., 0.0001) and B=6e-3 (i.e., 0.006). Plots of the EKF estimated values and actual values of parameter A are presented in the plot shown in FIG. 15A, and a partial magnified view thereof is shown in FIG. 15B. Plots of the EKF estimated values and actual values of parameter B are presented in the plot shown in FIG. 16A, and a partial magnified view thereof is shown in FIG. 16B. The actual and EKF estimated values are indicated in these figures. The progression of EKF estimator runs from left to right in these figures, and is observed to converge on the actual value.

Figure 17A:
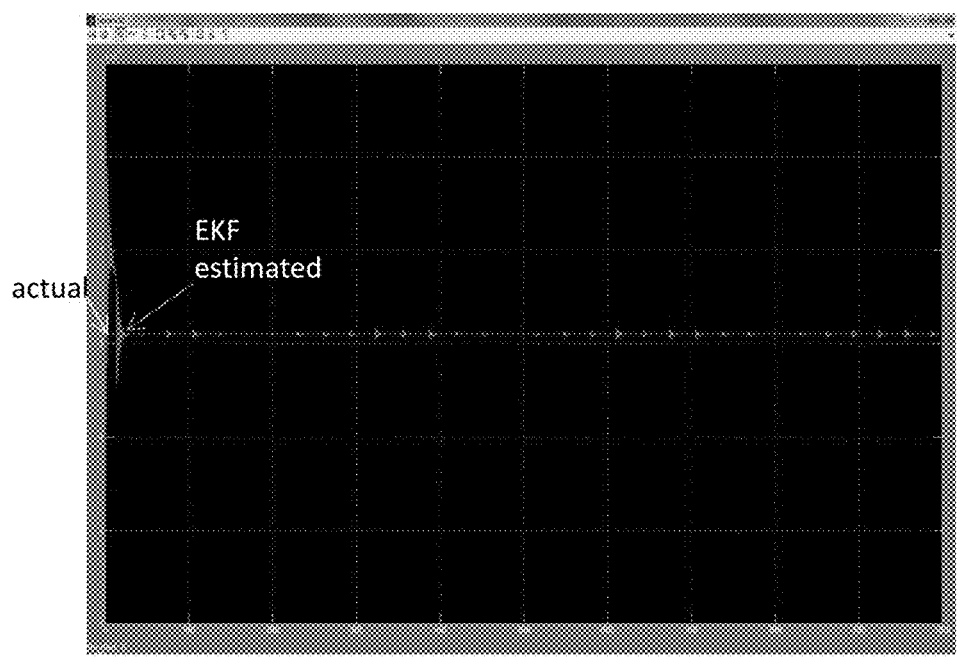
FIG. 17A is a plot showing (Extended Kalman Filter) EKF estimated values of Parameter A and the actual value when the simulation model was configured with A set to constant values and B set to a time varying value to model the effects of dynamically changing loads in the conditioned air space, according to an example of the present invention.
Figure 17B:
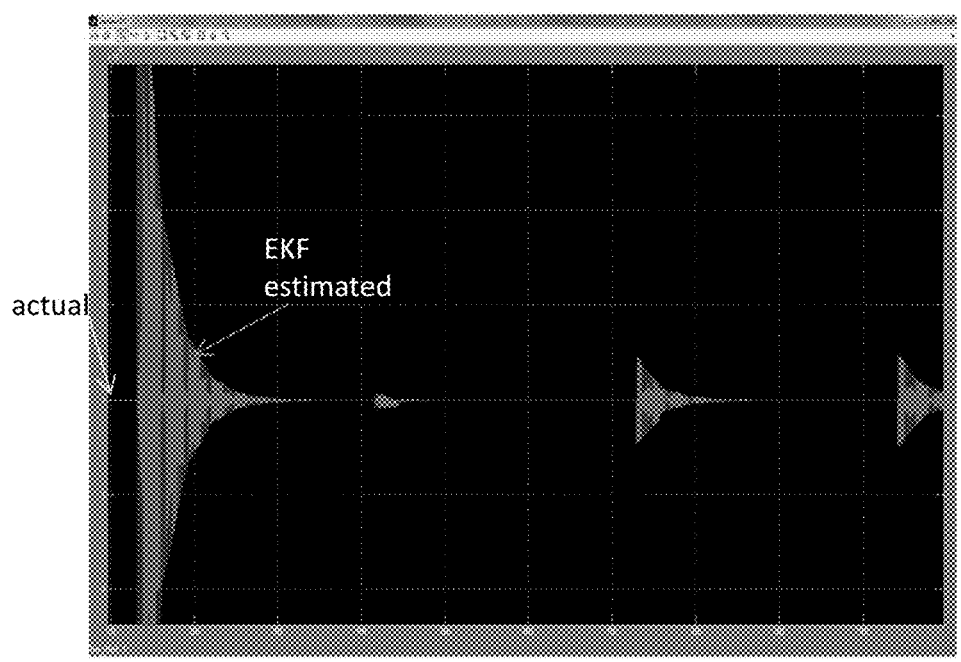
FIG. 17B is a magnified view of the left-side portion of the plot of FIG. 17A showing the (Extended Kalman Filter) EKF estimated values of Parameter A and the actual value, according to an example of the present invention.
Figure 18:
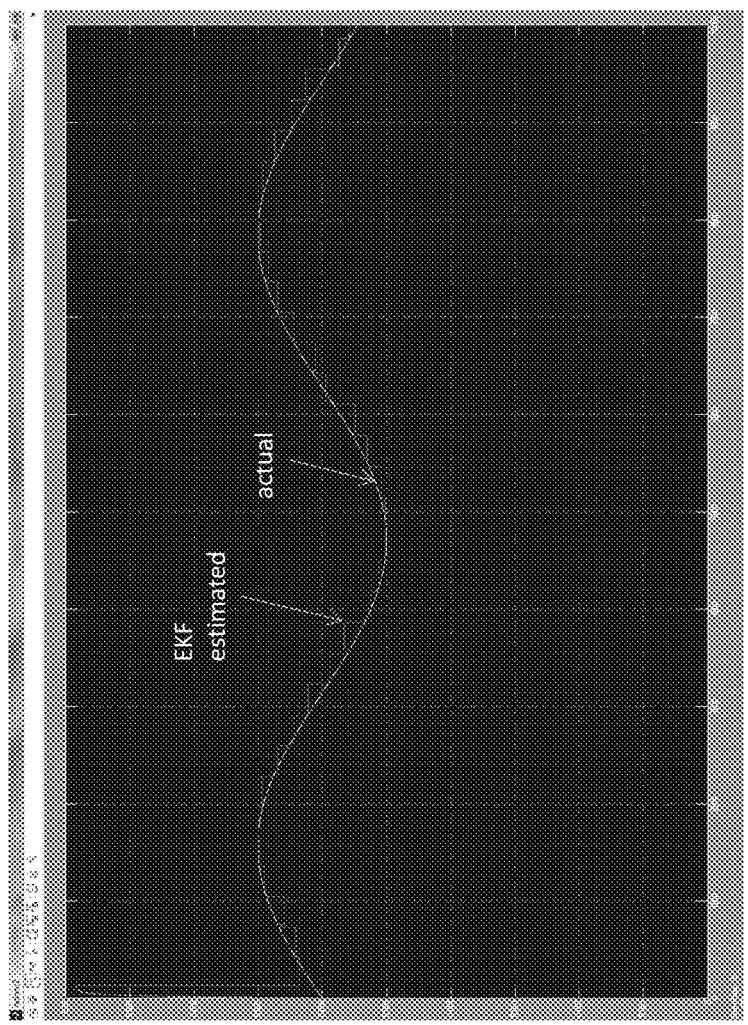
FIG. 18 is a plot that shows the estimation of the values of the parameter B with Extended Kalman Filter (EKF) according to an example of the present invention.

In Test 2: The simulation model was configured with a constant parameter A and a time varying B parameter. Specifically, the simulation model was configured with A set to a constant value of parameter A=1 e-4 (i.e., 0.0001) and B set to a time varying value to model the effects of dynamically changing loads in the conditioned air space. Plots of the EKF estimated values and actual values of parameter A are presented in the plot shown in FIG. 17A, and a partial magnified view thereof is shown in FIG. 17B. Plots of the EKF estimated values and actual values of parameter B are presented in the plot shown in FIG. 18. The actual and EKF estimated values are indicated in these figures. The progression of EKF estimator runs from left to right in these figures, and is observed to converge on the actual value.

As shown in the test results for Tests 1 and 2, the EKF quickly and accurately estimates the values of the two parameters, A and B.

Example 2

A simulation of an operation of a single stage cooling system, wherein a single thermostat is used to control one compressor, such as shown in FIG. 14, was performed on a computer model that was adapted to simulate operation of the electronic controller that applies the process control logic shown in FIGS. 3-8, 10 and 13 and calculation schemes of FIGS. 9, 11, and 12 herein. The developed model was based in part on actual data obtained from operation of the same equipment in the indicated single stage cooling configuration and with the OEM thermostat alone in the field. The simulation model is calibrated to agree with field data.

Figure 19:
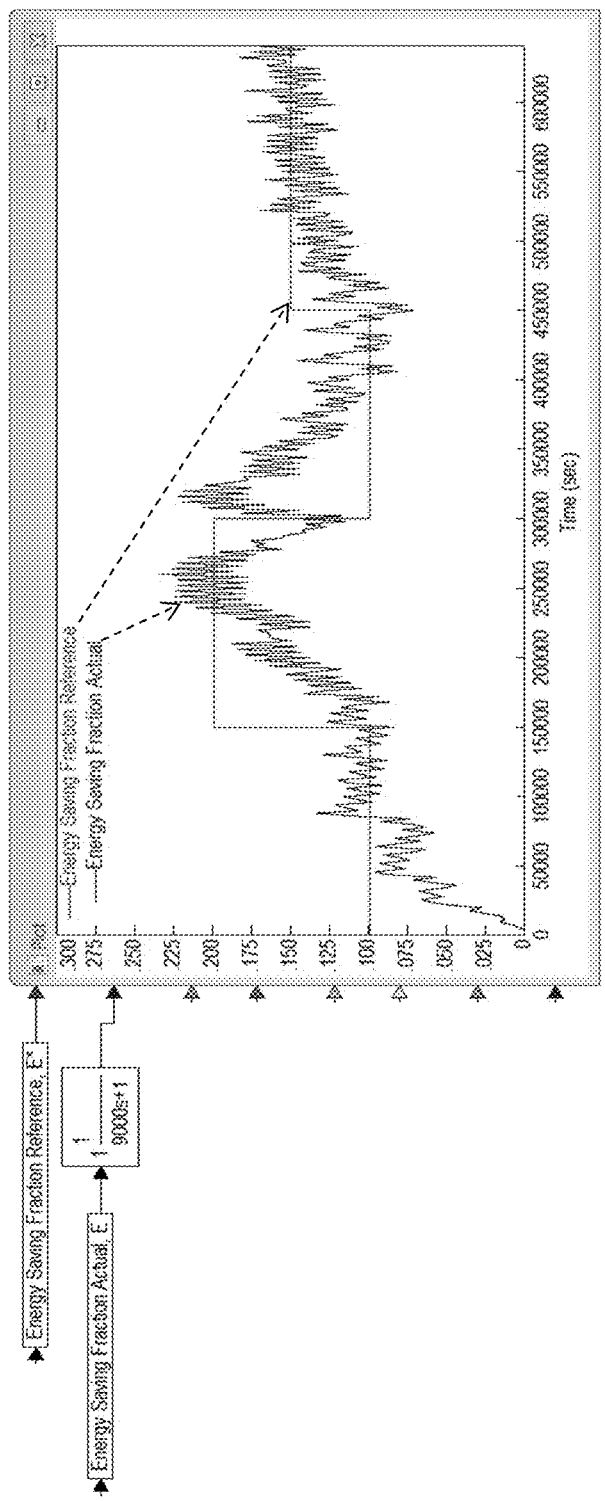
FIG. 19 is a plot of simulation results displaying the performance of the energy control algorithm of FIG. 3, which shows the energy saving controller performance thereof, according to an example of the present invention.
Figure 20:
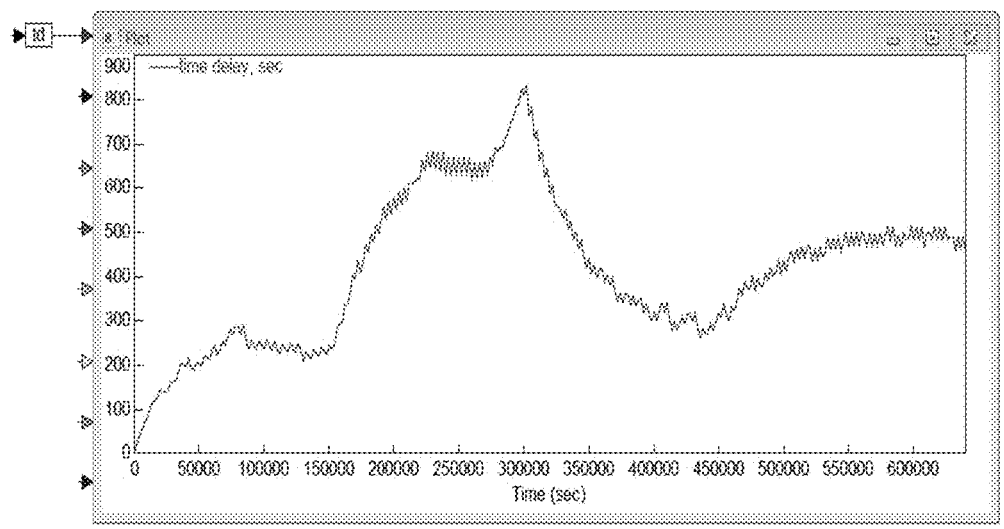
FIG. 20 is a time history plot which presents the time delay signal calculated by the electronic controller according to an example of the present invention.
Figure 21:
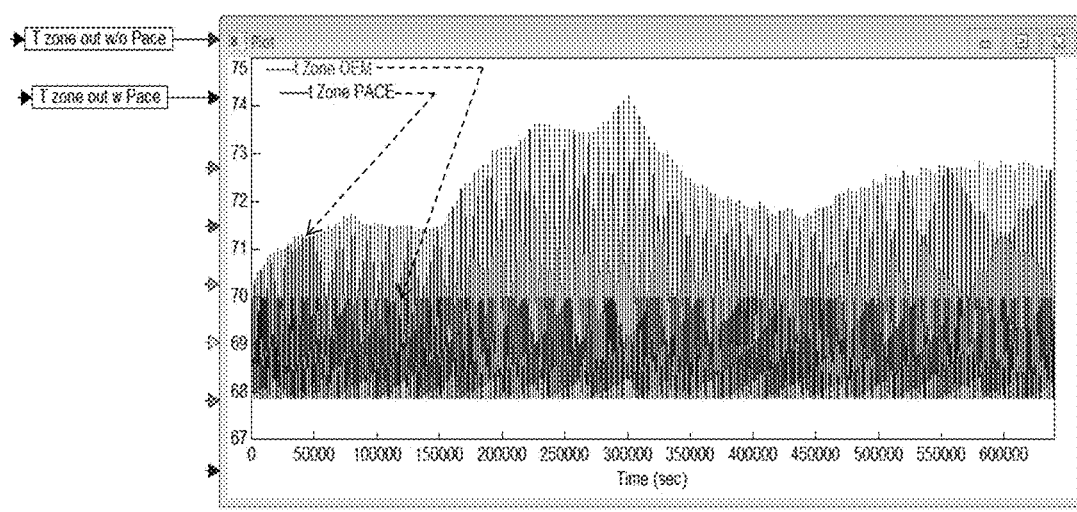
FIG. 21 shows time history plots which present the regulated zone temperature signals for the hysteresis thermostat signal ("uOEM") and inventive control signal ("UPace") controlled spaces, according to an example of the present invention.

Simulation results displaying the performance of the energy control algorithm are presented in the following time history plots. In FIG. 19, an "Energy Saving Fraction Reference, E*" profile was applied to the controller. The actual energy saved using the integral controller to adjust the time delay is shown. Plots of the values of these parameters are identified in FIG. 19. The profile begins at 0.1 (10% energy savings), at time=150,000 seconds, the E* profile increases to 0.2 (20% energy savings). Between 300,000 and 450,000 seconds the E* decreases back to 0.1 and from 450,000 seconds onward, it increases to 0.15 (15% energy savings). The 9000 second low pass filter in FIG. 19 is used to smooth the E signal for presentation in a time history plot. It is not used in the control algorithm. The time history plot shown in FIG. 20 presents the time delay signal calculated by the integral controller. This is the value used by the "time delay" block in FIG. 3 to create the uPACE control signal. The time history plots shown in FIG. 21 present the regulated zone temperature signals for the uOEM and uPACE controlled spaces. As shown by the plots, the temperature variation increases as energy is saved.

The present invention includes the following aspects/embodiments/features in any order and/or in any combination:

1. The present invention relates to a method for automatically controlling and managing energy consumption and operation of at least one load unit powered by electricity in an HVAC&R system to obtain a selected level of energy savings, comprising the steps of:

intercepting an original equipment manufacturer (OEM) thermostat command signal in-route from a hysteresis thermostat to at least one HVAC/R load unit at an electronic controller device;

sensing a first sensed signal representing an ON/OFF status of the at least one load unit of the HVAC&R system;

sensing a second sensed signal representing an outside air temperature;

sensing, optionally, a third sensed signal representing a conditioned space temperature;

determining a first model parameter (A) and a second model parameter (B) using (1) the first and second sensed signals or (2) the first, second and third sensed signals, wherein the first model parameter (A) comprising thermal resistivity between the outside air and a conditioned space having a conditioned space temperature, and a thermal capacitance value of the conditioned space, and the second model parameter (B) comprising a heat transfer coefficient, and a thermal capacitance value of the conditioned space;

estimating the (OEM) thermostat control signal over a moving time window using an energy control model, wherein the OEM thermostat control signal is estimated using a plant model module of the energy control model for a simulated hysteresis thermostat control of the at least one load unit of the HVAC&R system, wherein the plant model module incorporates the first model parameter (A) and the second model parameter (B);

estimating an adjusted control signal based on the estimated OEM thermostat control signal comprising applying a time delay to the estimated OEM thermostat control signal;

estimating a first energy consumption over the moving time window based on the estimated OEM thermostat control signal;

estimating a second energy consumption over the moving time window based on the estimated adjusted control signal;

estimating an energy consumption difference, normalized to the first energy consumption which is the estimated OEM signal energy consumption, between the first and second energy consumptions, to provide a calculated time delay feedback signal, wherein the calculated time delay feedback signal value drives the difference between the first and second energy consumptions normalized to the estimated OEM signal energy consumption to a selected energy savings setpoint value;

adjusting the calculated time delay feedback signal with reference to an inputted selected normalized time delay setpoint signal to provide an adjusted time delay feedback signal;

using the adjusted time delay feedback signal in the energy control model in estimating the adjusted control signal; and outputting the adjusted control signal generated by the electronic controller to a controller switch of at least one of the load units to control operation of the load unit, wherein the controller device replaces the intercepted thermostat command signal with the adjusted control signal while the thermostat command signal is calling for heating, cooling or refrigeration duty by the at least one load unit.

2. The method of any preceding or following embodiment/feature/aspect, wherein the determining of the first model parameter (A) uses the first and second sensed signals, and the determining of the second model parameter (B) uses the determined first model parameter (A) and the first and second sensed signals.

3. The method of any preceding or following embodiment/feature/aspect, wherein the determining of the first model parameter (A) and the second model parameter (B) comprises application of an Extended Kalman Filter.

4. The method of any preceding or following embodiment/feature/aspect, comprising using an energy saving control law module for i) inputting the calculated time delay feedback signal and the selected normalized time delay setpoint signal, ii) subtracting the calculated time delay feedback signal from the selected normalized time delay setpoint signal wherein an error signal being generated for a non-zero difference, and iii) applying an integral control law to reduce the error signal to zero by adjusting the calculated time delay feedback signal to obtain the selected normalized time delay setpoint signal.

5. The method of any preceding or following embodiment/feature/aspect, further comprising outputting of information of an estimate of energy savings in normalized form.

6. The present invention also relates to an electronic controller device for automatically controlling and managing energy consumption and operation of a duty cycled HVAC/R equipment to obtain a selected level of energy savings, comprising:

at least one input connector for attaching at least one thermostat signal line and at least one output connector for attaching at least one signal line for outputting a control signal from the controller device to a load unit, wherein the controller device is capable of intercepting a thermostat command signal in-route to the load unit and replacing the thermostat command signal with an adjusted control signal that is outputted to the load unit for automatically controlling the load unit while the thermostat command signal is calling for heating, cooling or refrigeration duty by the load unit, wherein the adjusted control signal comprises alternating pulse on and pulse off cycles which have respective durations that are determined according to computations that are performed with at least one processor and at least one memory storing instructions, the instructions comprising one or more instructions which, when executed by the at least one processor, cause the at least one processor to access and implement an energy control model which performs the steps comprising: a)i) inputting a first sensed signal representing an ON/OFF status of at least one load unit of the HVAC&R system, ii) inputting a second sensed signal representing an outside air temperature of outside air, and optionally, iii) inputting a third sensed signal representing a conditioned space temperature; b) determining a first model parameter (A) and a second model parameter (B) using (1) the first and second sensed signals or (2) the first, second and third sensed signals, wherein the first model parameter (A) comprising thermal resistivity between the outside air and a conditioned space, and a thermal capacitance value of the conditioned space, and the second model parameter (B) comprising a heat transfer coefficient including thermal capacitance of the conditioned space, and a thermal capacitance value of the conditioned space; c) estimating an original equipment manufacturer (OEM) thermostat control signal over a moving time window using the energy control model, wherein the OEM thermostat control signal is estimated using a plant model module of the energy control model for a simulated hysteresis thermostat control of the at least one load unit of the HVAC&R system, wherein the plant model module incorporates the first model parameter (A) and the second model parameter (B); d) estimating an adjusted control signal based on the estimated OEM thermostat control signal comprising applying a time delay to the estimated OEM thermostat control signal; e) estimating a first energy consumption over the moving time window based on the estimated OEM thermostat control signal; estimating a second energy consumption over the moving time window based on the estimated adjusted control signal; f) estimating an energy consumption difference, normalized to the first energy consumption, between the first and second energy consumptions, to provide a calculated time delay feedback signal, wherein the calculated time delay feedback signal value drives the difference between the first and second energy consumptions normalized to the estimated OEM signal energy consumption to a selected energy savings setpoint value; g) adjusting the calculated time delay feedback signal with reference to an inputted selected normalized time delay setpoint signal to provide an adjusted time delay feedback signal; h) using the adjusted time delay feedback signal in the energy control model in estimating the adjusted control signal; and i) outputting the adjusted control signal generated by the electronic controller to a controller switch of at least one of the load units to control operation of the load unit.

7. The electronic controller device of any preceding or following embodiment/feature/aspect, wherein the controller device is capable of intercepting a thermostat command signal in-route for at least one of a compressor, blower, or igniter, and replacing the thermostat command signal with the adjusted control signal.

8. The electronic controller device of any preceding or following embodiment/feature/aspect, wherein the at least one memory comprises at least one non-volatile memory device.

9. The electronic controller device of any preceding or following embodiment/feature/aspect, wherein the instructions are executable by the processor wherein the energy control model is capable of determining the first model parameter (A) using the first and second sensed signals, and capable of determining of the second model parameter (B) using the determined first model parameter (A) and the first and second sensed signals.

10. The electronic controller device of any preceding or following embodiment/feature/aspect, wherein the instructions are executable by the processor wherein the energy control model is capable of determining the first model parameter (A) and the second model parameter (B) comprising application of an estimation method.

11. The electronic controller device of any preceding or following embodiment/feature/aspect, wherein the estimation method is a method for estimation selected from Least Squares, Kalman Filtering, Neural networks, and Fuzzy logic.

12. The electronic controller device of any preceding or following embodiment/feature/aspect, wherein the estimation method is Extended Kalman Filter.

13. The present invention also relates to a system for automatic control of an HVAC&R system to obtain a selected level of energy savings, comprising:
a hysteresis (OEM) thermostat;
at least one of load unit operably connected to a power supply line;
a first temperature sensor for sensing an outside temperature and generating a sensed signal thereon;
a second temperature sensor for sensing a conditioned space temperature and generating a sensed signal thereon; and
an electronic controller connected to a control signal line which connects the at least one load unit with the hysteresis thermostat, the electronic controller is capable of obtaining sensed signals from the first temperature sensor and the second temperature sensor, and the controller device is capable of intercepting a thermostat command signal in-route to the load unit and replacing the thermostat command signal with an adjusted control signal that is outputted to the load unit for automatically controlling the load unit while the thermostat command signal is calling for heating, cooling or refrigeration duty by the load unit, wherein the adjusted control signal comprises alternating pulse on and pulse off cycles which have respective durations that are determined according to computations that are performed with at least one processor and at which, when executed by the at least one processor, cause the at least one processor to access and implement an energy control model which performs steps which comprise: a)i) inputting a first sensed signal from the first temperature sensor which represents an ON/OFF status of at least one load unit of the HVAC&R system, ii) inputting a second sensed signal from the second temperature sensor which represents an outside air temperature of outside air, and optionally, iii) inputting a third sensed signal representing a conditioned space temperature; b) determining a first model parameter (A) and a second model parameter (B) using (1) the first and second sensed signals or (2) the first, second and third sensed signals, wherein the first model parameter (A) comprising thermal resistivity between the outside air and a conditioned space having a conditioned space temperature, and a thermal capacitance value of the conditioned space, and the second model parameter (B) comprising a heat transfer coefficient, and a thermal capacitance value of the conditioned space; c) estimating an original equipment manufacturer (OEM) thermostat control signal over a moving time window using the energy control model, wherein the OEM thermostat control signal is estimated using a plant model module of the energy control model for a simulated hysteresis thermostat control of the at least one load unit of the HVAC&R system, wherein the plant model module incorporates the first model parameter (A) and the second model parameter (B); d) estimating an adjusted control signal based on the estimated OEM thermostat control signal comprising applying a time delay to the estimated OEM thermostat control signal; e) estimating a first energy consumption over the moving time window based on the estimated OEM thermostat control signal; estimating a second energy consumption over the moving time window based on the estimated adjusted control signal; f) estimating an energy consumption difference, normalized to the first energy consumption, between the first and second energy consumptions, to provide a calculated time delay feedback signal, wherein the calculated time delay feedback signal value drives the difference between the first and second energy consumptions normalized to the estimated OEM signal energy consumption to a selected energy savings setpoint value; g) adjusting the calculated time delay feedback signal with reference to an inputted selected normalized time delay setpoint signal to provide an adjusted time delay feedback signal; and h) using the adjusted time delay feedback signal in the energy control model in estimating the adjusted control signal; and i) outputting the adjusted control signal generated by the electronic controller to a controller switch of at least one of the load units to control operation of the load unit.

14. The system of any preceding or following embodiment/feature/aspect, wherein the at least one load unit of the HVAC&R system comprises at least one of a compressor, a blower, a gas heater, an oil heater, an electric heater, or a boiler.

15. The system of any preceding or following embodiment/feature/aspect, wherein the at least one memory comprises at least one non-volatile memory device.

16. The system of any preceding or following embodiment/feature/aspect, wherein the energy control model is capable of determining the first model parameter (A) using the first and second sensed signals, and capable of determining of the second model parameter (B) using the determined first model parameter (A) and the first and second sensed signals.

17. The system of any preceding or following embodiment/feature/aspect, wherein the energy control model is capable of determining the first model parameter (A) and the second model parameter (B) comprising application of an estimation method.

18. The system of any preceding or following embodiment/feature/aspect, wherein the estimation method is a method for estimation selected from Least Squares, Kalman Filtering, Neural networks, and Fuzzy logic.

19. The present invention also relates to a non-transitory computer readable storage medium storing instructions which, when executed by a computer, cause the computer to execute a process, the process comprising: (i) determining a first model parameter (A) and a second model parameter (B) using (1) first and second sensed signals, or (2) first, second and third sensed signals, wherein the first sensed signal represents an ON/OFF status of at least one load unit of a HVAC&R system, the second sensed signal represents an outside air temperature of outside air, and the third signal represents a conditioned space temperature, wherein the first model parameter (A) comprising thermal resistivity between the outside air and a conditioned space having a conditioned space temperature, and a thermal capacitance value of the conditioned space, and the second model parameter (B) comprising a heat transfer coefficient and a thermal capacitance value of the conditioned space; (ii) estimating an original equipment manufacturer (OEM) thermostat control signal over a moving time window, wherein the OEM thermostat control signal is estimated using a plant model module of the energy control model for a simulated hysteresis thermostat control of the at least one load unit of the HVAC&R system, wherein the plant model module incorporates the first model parameter (A) and the second model parameter (B); (iii) estimating an adjusted control signal based on the estimated OEM thermostat control signal comprising applying a time delay to the estimated OEM thermostat control signal; (iv) estimating a first energy consumption over the moving time window based on the estimated OEM thermostat control signal; (v) estimating a second energy consumption over the moving time window based on the estimated adjusted control signal; (vi) estimating an energy consumption difference, normalized to the first energy consumption, between the first and second energy consumptions, to provide a calculated time delay feedback signal, wherein the calculated time delay feedback signal value drives the difference between the first and second energy consumptions normalized to the estimated OEM signal energy consumption to a selected energy savings setpoint value; (vii) adjusting the calculated time delay feedback signal with reference to an inputted selected normalized time delay setpoint signal to provide an adjusted time delay feedback signal; (viii) using the adjusted time delay feedback signal in the energy control model in estimating the adjusted control signal; and (ix) outputting information on the estimated adjusted control signal, wherein the adjusted control signal that incorporates the adjusted time delay provides a selected level of energy savings.

The present invention can include any combination of these various features or embodiments above and/or below as set forth in sentences and/or paragraphs. Any combination of disclosed features herein is considered part of the present invention and no limitation is intended with respect to combinable features.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method for automatically controlling and managing energy consumption and operation of at least one load unit powered by electricity in an HVAC&R system to obtain a selected level of energy savings, comprising the steps of:

intercepting an original equipment manufacturer (OEM) thermostat command signal in-route from a hysteresis thermostat to at least one HVAC/R load unit at an electronic controller device;

sensing a first sensed signal representing an ON/OFF status of the at least one load unit of the HVAC&R system;

sensing a second sensed signal representing an outside air temperature;

sensing, optionally, a third sensed signal representing a conditioned space temperature;

determining a first model parameter (A) and a second model parameter (B) using (1) the first and second sensed signals or (2) the first, second and third sensed signals, wherein the first model parameter (A) comprising thermal resistivity between the outside air and a conditioned space having a conditioned space temperature, and a thermal capacitance value of the conditioned space, and the second model parameter (B) comprising a heat transfer coefficient, and a thermal capacitance value of the conditioned space;

estimating the (OEM) thermostat control signal over a moving time window using an energy control model, wherein the OEM thermostat control signal is estimated using a plant model module of the energy control model for a simulated hysteresis thermostat control of the at least one load unit of the HVAC&R system, wherein the plant model module incorporates the first model parameter (A) and the second model parameter (B);

estimating an adjusted control signal based on the estimated OEM thermostat control signal comprising applying a time delay to the estimated OEM thermostat control signal;

estimating a first energy consumption over the moving time window based on the estimated OEM thermostat control signal;

estimating a second energy consumption over the moving time window based on the estimated adjusted control signal;

estimating an energy consumption difference, normalized to the first energy consumption which is the estimated OEM signal energy consumption, between the first and second energy consumptions, to provide a calculated time delay feedback signal, wherein the calculated time delay feedback signal value drives the difference between the first and second energy consumptions normalized to the estimated OEM signal energy consumption to a selected energy savings setpoint value;

adjusting the calculated time delay feedback signal with reference to an inputted selected normalized time delay setpoint signal to provide an adjusted time delay feedback signal;

using the adjusted time delay feedback signal in the energy control model in estimating the adjusted control signal; and outputting the adjusted control signal generated by the electronic controller to a controller switch of at least one of the load units to control operation of the load unit, wherein the controller device replaces the intercepted thermostat command signal with the adjusted control signal while the thermostat command signal is calling for heating, cooling or refrigeration duty by the at least one load unit.

2. The method of claim 1, wherein the determining of the first model parameter (A) uses the first and second sensed signals, and the determining of the second model parameter (B) uses the determined first model parameter (A) and the first and second sensed signals.

3. The method of claim 1, wherein the determining of the first model parameter (A) and the second model parameter (B) comprises application of an Extended Kalman Filter.

4. The method of claim 1, comprising using an energy saving control law module for i) inputting the calculated time delay feedback signal and the selected normalized time delay setpoint signal, ii) subtracting the calculated time delay feedback signal from the selected normalized time delay setpoint signal wherein an error signal being generated for a non-zero difference, and iii) applying an integral control law to reduce the error signal to zero by adjusting the calculated time delay feedback signal to obtain the selected normalized time delay setpoint signal.

5. The method of claim 1, further comprising outputting of information of an estimate of energy savings in normalized form.

6. An electronic controller device for automatically controlling and managing energy consumption and operation of a duty cycled HVAC/R equipment to obtain a selected level of energy savings, comprising:

at least one input connector for attaching at least one thermostat signal line and at least one output connector for attaching at least one signal line for outputting a control signal from the controller device to a load unit, wherein the controller device is capable of intercepting a thermostat command signal in-route to the load unit and replacing the thermostat command signal with an adjusted control signal that is outputted to the load unit for automatically controlling the load unit while the thermostat command signal is calling for heating, cooling or refrigeration duty by the load unit, wherein the adjusted control signal comprises alternating pulse on and pulse off cycles which have respective durations that are determined according to computations that are performed with at least one processor and at least one memory storing instructions, the instructions comprising one or more instructions which, when executed by the at least one processor, cause the at least one processor to access and implement an energy control model which performs the steps comprising: a)i) inputting a first sensed signal representing an ON/OFF status of at least one load unit of the HVAC&R system, ii) inputting a second sensed signal representing an outside air temperature of outside air, and optionally, iii) inputting a third sensed signal representing a conditioned space temperature; b) determining a first model parameter (A) and a second model parameter (B) using (1) the first and second sensed signals or (2) the first, second and third sensed signals, wherein the first model parameter (A) comprising thermal resistivity between the outside air and a conditioned space, and a thermal capacitance value of the conditioned space, and the second model parameter (B) comprising a heat transfer coefficient including thermal capacitance of the conditioned space, and a thermal capacitance value of the conditioned space; c) estimating an original equipment manufacturer (OEM) thermostat control signal over a moving time window using the energy control model, wherein the OEM thermostat control signal is estimated using a plant model module of the energy control model for a simulated hysteresis thermostat control of the at least one load unit of the HVAC&R system, wherein the plant model module incorporates the first model parameter (A) and the second model parameter (B); d) estimating an adjusted control signal based on the estimated OEM thermostat control signal comprising applying a time delay to the estimated OEM thermostat control signal; e) estimating a first energy consumption over the moving time window based on the estimated OEM thermostat control signal; estimating a second energy consumption over the moving time window based on the estimated adjusted control signal; f) estimating an energy consumption difference, normalized to the first energy consumption, between the first and second energy consumptions, to provide a calculated time delay feedback signal, wherein the calculated time delay feedback signal value drives the difference between the first and second energy consumptions normalized to the estimated OEM signal energy consumption to a selected energy savings setpoint value; g) adjusting the calculated time delay feedback signal with reference to an inputted selected normalized time delay setpoint signal to provide an adjusted time delay feedback signal; h) using the adjusted time delay feedback signal in the energy control model in estimating the adjusted control signal; and i) outputting the adjusted control signal generated by the electronic controller to a controller switch of at least one of the load units to control operation of the load unit.

7. The electronic controller device of claim 6, wherein the controller device is capable of intercepting a thermostat command signal in-route for at least one of a compressor, blower, or igniter, and replacing the thermostat command signal with the adjusted control signal.

8. The electronic controller device of claim 6, wherein the at least one memory comprises at least one non-volatile memory device.

9. The electronic controller device of claim 6, wherein the instructions are executable by the processor wherein the energy control model is capable of determining the first model parameter (A) using the first and second sensed signals, and capable of determining of the second model parameter (B) using the determined first model parameter (A) and the first and second sensed signals.

10. The electronic controller device of claim 6, wherein the instructions are executable by the processor wherein the energy control model is capable of determining the first model parameter (A) and the second model parameter (B) comprising application of an estimation method.

11. The electronic controller device of claim 10, wherein the estimation method is a method for estimation selected from Least Squares, Kalman Filtering, Neural networks, and Fuzzy logic.

12. The electronic controller device of claim 10, wherein the estimation method is Extended Kalman Filter.

13. A system for automatic control of an HVAC&R system to obtain a selected level of energy savings, comprising:
a hysteresis (OEM) thermostat;
at least one of load unit operably connected to a power supply line;
a first temperature sensor for sensing an outside temperature and generating a sensed signal thereon;
a second temperature sensor for sensing a conditioned space temperature and generating a sensed signal thereon; and
an electronic controller connected to a control signal line which connects the at least one load unit with the hysteresis thermostat, the electronic controller is capable of obtaining sensed signals from the first temperature sensor and the second temperature sensor, and the controller device is capable of intercepting a thermostat command signal in-route to the load unit and replacing the thermostat command signal with an adjusted control signal that is outputted to the load unit for automatically controlling the load unit while the thermostat command signal is calling for heating, cooling or refrigeration duty by the load unit, wherein the adjusted control signal comprises alternating pulse on and pulse off cycles which have respective durations that are determined according to computations that are performed with at least one processor and at which, when executed by the at least one processor, cause the at least one processor to access and implement an energy control model which performs steps which comprise: a)i) inputting a first sensed signal from the first temperature sensor which represents an ON/OFF status of at least one load unit of the HVAC&R system, ii) inputting a second sensed signal from the second temperature sensor which represents an outside air temperature of outside air, and optionally, iii) inputting a third sensed signal representing a conditioned space temperature; b) determining a first model parameter (A) and a second model parameter (B) using (1) the first and second sensed signals or (2) the first, second and third sensed signals, wherein the first model parameter (A) comprising thermal resistivity between the outside air and a conditioned space having a conditioned space temperature, and a thermal capacitance value of the conditioned space, and the second model parameter (B) comprising a heat transfer coefficient, and a thermal capacitance value of the conditioned space; c) estimating an original equipment manufacturer (OEM) thermostat control signal over a moving time window using the energy control model, wherein the OEM thermostat control signal is estimated using a plant model module of the energy control model for a simulated hysteresis thermostat control of the at least one load unit of the HVAC&R system, wherein the plant model module incorporates the first model parameter (A) and the second model parameter (B); d) estimating an adjusted control signal based on the estimated OEM thermostat control signal comprising applying a time delay to the estimated OEM thermostat control signal; e) estimating a first energy consumption over the moving time window based on the estimated OEM thermostat control signal; estimating a second energy consumption over the moving time window based on the estimated adjusted control signal; f) estimating an energy consumption difference, normalized to the first energy consumption, between the first and second energy consumptions, to provide a calculated time delay feedback signal, wherein the calculated time delay feedback signal value drives the difference between the first and second energy consumptions normalized to the estimated OEM signal energy consumption to a selected energy savings setpoint value; g) adjusting the calculated time delay feedback signal with reference to an inputted selected normalized time delay setpoint signal to provide an adjusted time delay feedback signal; and h) using the adjusted time delay feedback signal in the energy control model in estimating the adjusted control signal; and i) outputting the adjusted control signal generated by the electronic controller to a controller switch of at least one of the load units to control operation of the load unit.

14. The system of claim 13, wherein the at least one load unit of the HVAC&R system comprises at least one of a compressor, a blower, a gas heater, an oil heater, an electric heater, or a boiler.

15. The system of claim 13, wherein the at least one memory comprises at least one non-volatile memory device.

16. The system of claim 13, wherein the energy control model is capable of determining the first model parameter (A) using the first and second sensed signals, and capable of determining of the second model parameter (B) using the determined first model parameter (A) and the first and second sensed signals.

17. The system of claim 13, wherein the energy control model is capable of determining the first model parameter (A) and the second model parameter (B) comprising application of an estimation method.

18. The system of claim 13, wherein the estimation method is a method for estimation selected from Least Squares, Kalman Filtering, Neural networks, and Fuzzy logic.

19. A non-transitory computer readable storage medium storing instructions which, when executed by a computer, cause the computer to execute a process, the process comprising: (i) determining a first model parameter (A) and a second model parameter (B) using (1) first and second sensed signals, or (2) first, second and third sensed signals, wherein the first sensed signal represents an ON/OFF status of at least one load unit of a HVAC&R system, the second sensed signal represents an outside air temperature of outside air, and the third signal represents a conditioned space temperature, wherein the first model parameter (A) comprising thermal resistivity between the outside air and a conditioned space having a conditioned space temperature, and a thermal capacitance value of the conditioned space, and the second model parameter (B) comprising a heat transfer coefficient and a thermal capacitance value of the conditioned space; (ii) estimating an original equipment manufacturer (OEM) thermostat control signal over a moving time window, wherein the OEM thermostat control signal is estimated using a plant model module of the energy control model for a simulated hysteresis thermostat control of the at least one load unit of the HVAC&R system, wherein the plant model module incorporates the first model parameter (A) and the second model parameter (B); (iii) estimating an adjusted control signal based on the estimated OEM thermostat control signal comprising applying a time delay to the estimated OEM thermostat control signal; (iv) estimating a first energy consumption over the moving time window based on the estimated OEM thermostat control signal; (v) estimating a second energy consumption over the moving time window based on the estimated adjusted control signal; (vi) estimating an energy consumption difference, normalized to the first energy consumption, between the first and second energy consumptions, to provide a calculated time delay feedback signal, wherein the calculated time delay feedback signal value drives the difference between the first and second energy consumptions normalized to the estimated OEM signal energy consumption to a selected energy savings setpoint value; (vii) adjusting the calculated time delay feedback signal with reference to an inputted selected normalized time delay setpoint signal to provide an adjusted time delay feedback signal; (viii) using the adjusted time delay feedback signal in the energy control model in estimating the adjusted control signal; and (ix) outputting information on the estimated adjusted control signal, wherein the adjusted control signal that incorporates the adjusted time delay provides a selected level of energy savings.

* * * * *